United States Patent [19]
Kobayashi et al.

[11] Patent Number: 5,881,352
[45] Date of Patent: Mar. 9, 1999

[54] IMAGE FORMING APPARATUS HAVING A FINISHER

[75] Inventors: Tadashi Kobayashi, Toyokawa; Ryo Hirano, Toyohashi, both of Japan

[73] Assignee: Minolta Co., Ltd., Osaka, Japan

[21] Appl. No.: 948,223

[22] Filed: Oct. 9, 1997

[30] Foreign Application Priority Data

Dec. 27, 1996 [JP] Japan .................................. 8-351477
Dec. 27, 1996 [JP] Japan .................................. 8-351479

[51] Int. Cl.⁶ ............................ B42C 19/00; G03G 15/00
[52] U.S. Cl. .......................... 399/408; 270/37; 399/38; 399/382
[58] Field of Search .......................... 399/38, 382, 407, 399/408, 409, 410; 358/296; 395/115, 116, 117; 270/58.07, 58.08, 37; 355/72

[56] References Cited

U.S. PATENT DOCUMENTS

| | | | |
|---|---|---|---|
| 4,592,651 | 6/1986 | Oikawa et al. | 355/72 |
| 5,032,876 | 7/1991 | Murakami | 399/410 |
| 5,343,304 | 8/1994 | Nakai et al. | 358/296 |
| 5,382,011 | 1/1995 | Tani | 270/37 |
| 5,461,459 | 10/1995 | Muramatsu et al. | 399/408 X |
| 5,722,031 | 2/1998 | Fujii et al. | 399/410 |
| 5,752,154 | 5/1998 | Maruyama et al. | 399/407 |

FOREIGN PATENT DOCUMENTS 08-143212  6/1996  Japan .

*Primary Examiner*—Matthew S. Smith
*Assistant Examiner*—Sophia S. Chen
*Attorney, Agent, or Firm*—Sidley & Austin

[57] ABSTRACT

An image forming apparatus is mounted in a copying machine or a printer and is adapted to serve the purpose of bundling and stapling a plurality of copied or printed sheets, automatically encasing the stapled bundle of sheets with a cover specially designed for enclosure, and binding the cover. The apparatus has an image memory, an image signal processing part, an image producing part, a sheet accumulating part, a cover storing part, a cover delivering part, a cover supporting part, a sheet delivering and inserting part, a heating part, and a CPU.

18 Claims, 26 Drawing Sheets

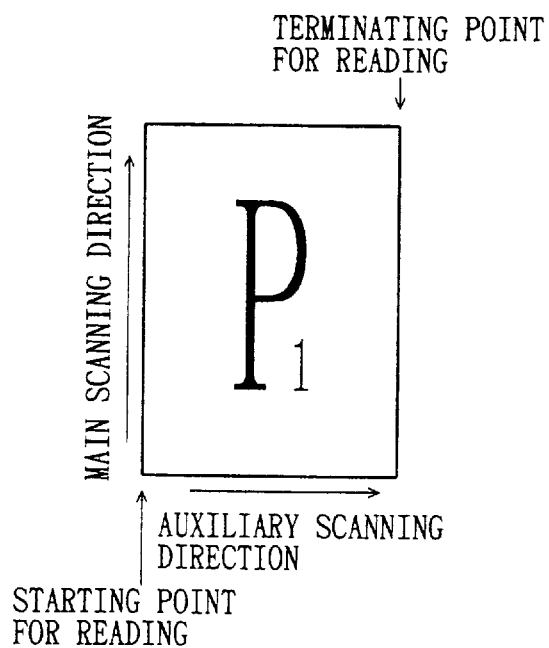

FIG. 10A (MEMORY CAPACITY)

| | AREA | CONTRACTED CODE DATA |
|---|---|---|
| 0 | 0 1 | CODE DATA OF FIRST PAGE |
| 3 2 K | 0 2 | CODE DATA OF SECOND PAGE |
| 6 4 K | 0 3 | CODE DATA OF THIRD PAGE |
| 9 6 K | 0 4 | CODE DATA OF FOURTH PAGE |
| 1 2 8 K | ⋮ | ⋮ |

FIG. 10B

MANAGING TABLE MT

| AREA | No | FORMER CONNECTION | LATTER CONNECTION | ADDITIONAL INFORMATION |
|---|---|---|---|---|
| 0 1 | 1 | 0 0 | F F | |
| 0 2 | 2 | 0 0 | F F | |
| 0 3 | 3 | 0 0 | F F | |
| 0 4 | 4 | 0 0 | F F | |
| ⋮ | ⋮ | ⋮ | ⋮ | |

OUTPUT DESIGNATING TABLE (RIGHT BINDING)

| AREA | No | FORMER CONNECTION | LATTER CONNECTION | ADDITIONAL INFORMATION |
|------|----|-------------------|-------------------|------------------------|
| 0 1  | 1  | 0 0               | F F               | 180° ROTATION          |
| 0 2  | 2  | 0 0               | F F               | 180° ROTATION          |
| 0 3  | 3  | 0 0               | F F               | 180° ROTATION          |
| 0 4  | 4  | 0 0               | F F               | 180° ROTATION          |
| .    | .  | .                 | .                 |                        |
| .    | .  | .                 | .                 |                        |
| .    | .  | .                 | .                 |                        |

(RIGHT BINDING)

DIRECTION OF CONVEYANCE OF SHEET

STARTING POINT FOR OUTPUT

OUTPUT DESIGNATING TABLE (LEFT BINDING)

| AREA | No | FORMER CONNECTION | LATTER CONNECTION | ADDITIONAL INFORMATION |
|---|---|---|---|---|
| 0 1 | 1 | 0 0 | F F | |
| 0 2 | 2 | 0 0 | F F | |
| 0 3 | 3 | 0 0 | F F | |
| 0 4 | 4 | 0 0 | F F | |
| . | . | . | . | |
| . | . | . | . | |
| . | . | . | . | |

(LEFT BINDING)

← DIRECTION OF CONVEYANCE OF SHEET

STARTING POINT FOR OUTPUT

FIG. 18A (MEMORY CAPACITY)

| AREA | CONTRACTED CODE DATA |
|---|---|
| 0 1 | CODE DATA OF FIRST PAGE |
| 0 2 | CODE DATA OF SECOND PAGE |
| 0 3 | CODE DATA OF THIRD PAGE |
| 0 4 | CODE DATA OF FOURTH PAGE |
| ⋮ | ⋮ |

MANAGING TABLE MT

| AREA | No | FORMER CONNECTION | LATTER CONNECTION | ADDITIONAL INFORMATION |
|---|---|---|---|---|
| 0 1 | 1 | 0 0 | F F | |
| 0 2 | 2 | 0 0 | F F | |
| 0 3 | 3 | 0 0 | F F | |
| 0 4 | 4 | 0 0 | F F | |
| ⋮ | ⋮ | ⋮ | ⋮ | |

FIG. 19

OUTPUT DESIGNATING TABLE (2-IN-1, RIGHT BINDING)

| AREA | No | FOMRER CONNECTION | LATTER CONNECTION | ADDITIONAL INFORMATION |
|---|---|---|---|---|
| 0 2 | 2 | 0 0 | 0 1 | |
| 0 1 | 1 | 0 2 | F F | |
| 0 4 | 4 | 0 0 | 0 3 | |
| 0 3 | 3 | 0 4 | F F | |
| ⋮ | ⋮ | ⋮ | ⋮ | |

(RIGHT BINDING)

DIRECTION OF CONVEYANCE OF SHEET

STARTING POINT
FOR OUTPUT

FIG. 21

OUTPUT DESIGNATING TABLE (2-IN-1, LEFT BINDING)

| AREA | No | FORMER CONNECTION | LATTER CONNECTION | ADDITIONAL INFORMATION |
|------|----|-------------------|-------------------|------------------------|
| 0 2  | 2  | 0 0               | 0 1               | 180° ROTATION          |
| 0 1  | 1  | 0 2               | F F               | 180° ROTATION          |
| 0 4  | 4  | 0 0               | 0 3               | 180° ROTATION          |
| 0 3  | 3  | 0 4               | F F               | 180° ROTATION          |
| ·    | ·  | ·                 | ·                 |                        |
| ·    | ·  | ·                 | ·                 |                        |
| ·    | ·  | ·                 | ·                 |                        |

(LEFT BINDING)

← DIRECTION OF CONVEYANCE OF SHEET

STARTING POINT FOR OUTPUT

FIG. 24A (MEMORY CAPACITY)

| | AREA | CONTRACTED CODE DATA |
|---|---|---|
| 0 ⋯ | 0 1 | CODE DATA 1 OF FIRST PAGE |
| 3 2 K ⋯ | 0 2 | CODE DATA 2 OF FIRST PAGE |
| 6 4 K ⋯ | 0 3 | CODE DATA 1 OF SECOND PAGE |
| 9 6 K ⋯ | 0 4 | CODE DATA 2 OF SECOND PAGE |
| 1 2 8 K ⋯ | · | · |
| | · | · |
| | · | · |

FIG. 24B

MANAGING TABLE MT

| AREA | No | FORMER CONNECTION | LATTER CONNECTION | ADDITIONAL INFORMATION |
|---|---|---|---|---|
| 0 1 | 1 | 0 0 | 0 2 | |
| 0 2 | 1 | 0 1 | F F | |
| 0 3 | 2 | 0 0 | 0 4 | |
| 0 4 | 2 | 0 3 | F F | |
| · | · | · | · | |
| · | · | · | · | |
| · | · | · | · | |

FIG. 25

OUTPUT DESIGNATING TABLE (1-IN-1, RIGHT BINDING)

| AREA | No | FORMER CONNECTION | LATTER CONNECTION | ADDITIONAL INFORMATION |
|---|---|---|---|---|
| 0 2 | 1 | 0 0 | 0 1 | |
| 0 1 | 1 | 0 2 | F F | |
| 0 4 | 2 | 0 0 | 0 3 | |
| 0 3 | 2 | 0 4 | F F | |
| · | · | · | · | |
| · | · | · | · | |
| · | · | · | · | |

OUTPUT DESIGNATING TABLE (1-IN-1, LEFT BINDING)

| AREA | No | FORMER CONNECTION | LATTER CONNECTION | ADDITIONAL INFORMATION |
|------|----|--------------------|--------------------|------------------------|
| 0 2  | 1  | 0 0                | 0 1                | 180° ROTATION          |
| 0 1  | 1  | 0 2                | F F                | 180° ROTATION          |
| 0 4  | 2  | 0 0                | 0 3                | 180° ROTATION          |
| 0 3  | 2  | 0 4                | F F                | 180° ROTATION          |
| .    | .  | .                  | .                  |                        |
| .    | .  | .                  | .                  |                        |
| .    | .  | .                  | .                  |                        |

AUXILIARY SCANNING
DIRECTION

AUXILIARY SCANNING
DIRECTION

IMAGE FORMING APPARATUS HAVING A FINISHER

BACKGROUND OF THE INVENTION

1. Field of the Invention

This invention relates to an image forming apparatus furnished with a finisher which is mounted in a copying machine or a printer and adapted to serve the purpose of bundling and stapling a plurality of copied or printed sheets, automatically encasing the stapled bundle of sheets with a cover specially designed for enclosure, and binding the cover.

2. Description of the Related Art

In recent years, some of such image forming apparatuses as copying machines and printers are furnished with an aftertreating device serving the purpose of automatically collecting sheets discharged from the apparatus, binding a bundle of these sheets with staples, encasing the stapled bundle with a cover specially designed for enclosure, and automatically binding the cover.

The cover specially designed to be used by the finisher of this description has fusible mucilage applied to such parts thereof as form an inside and a back. The finisher binds the plurality of sheets by encasing the sheets with the special cover and applying heat to the part of the cover forming the back thereby joining the sheets with the mucilage.

The bound documents are known in two types as sorted by the manner of binding, namely the documents of the right binding which binds a given document by applying mucilage to the right side of the document as illustrated in FIG. 29A and the documents of the left binding which binds a given document by applying mucilage to the left side of the document as illustrated in FIG. 29B. More often than not in the case of the documents written in the Japanese language, the documents having characters arranged vertically are in the right binding and the documents having characters arranged laterally are in the left binding.

Incidentally, the finisher which is mounted in the copying machine or the printer, on receiving sheets delivered from the copying machine or the printer, inserts the sheets in the same direction as used in the conveyance thereto into the special cover and binds them with the mucilage applied to the part of the back. As a result, it has the problem of betraying the inability to govern arbitrarily the distinction between the right binding and the left binding. Of course, it is not inconceivable that by incorporating a complicated switchback mechanism or a sheet inverting path in the sheet conveying path, the finisher is enabled to change mechanically the direction of sheet, depending on the selection between the right binding and the left binding, insert the sheets delivered in the selected direction into the special cover, and bind the cover. This measure, however, entails the problem of enlarging the apparatus and increasing the cost thereof.

Among the finishers of this class are included those which are provided with a sheet folding device capable of folding a discharged image-bearing sheet doubly in the central part thereof. The finisher which is provided with such a sheet folding device is enabled to fold a sheet doubly in the central part thereof and perform a stapling treatment on the edge part of the folded sheet to effect covered binding.

When a plurality of sheets are subjected to the covered binding, they may be bound on the right side (right binding) as illustrated in FIG. 30A or on the left side (left binding) as illustrated in FIG. 30B, when viewed from the front side of sheet. Also in the case of this covered binding, more often than not the documents having characters longitudinally arranged are bound on the right side and the documents having characters laterally arranged are bound on the left side.

In the case of the covered binding, however, while the sheets in a doubly folded state produce covered binding when they are found in the edge part, they produce no covered binding as illustrated in FIG. 31 when they are found on the opposite side, namely on the side forming a crease of fold. The right binding or the left binding cannot be arbitrarily selected simply by changing the sides to be bound.

A method for very simply solving this problem attendant on the covered binding as described above, for example, resides in providing a copying machine capable of copying original documents set therein sequentially from the first page onward with a finisher capable of giving each of the sheets the covered binding in the left binding. The copying machine, when operated to copy the original documents set therein sequentially from the last page backward, produces documents of the covered binding in the right binding. In this case, however, since the staples plunge into the bundle of sheets from the last page side as illustrated in FIG. 32, they give rise to the problem that the folded shanks of these staples finally rest on the front side of the first page and impair the appearance of the finished document. Further, the person engaging in the manual operation of the copying machine is compelled to do the work of rearranging all the original documents for printing. Thus, the automation of the covered binding possibly entails the problem of rather lowering the operational efficiency.

SUMMARY OF THE INVENTION

One object of this invention, therefore, resides in providing an image forming apparatus incorporating therein a finisher capable of binding a plurality of sheets by the use of a special cover having a fusible adhesive agent applied in advance to the part of the back, the finisher therefore enabling the apparatus to effect arbitrarily the right binding or the left binding on a document.

Another object of this invention consists in providing an image forming apparatus which is capable of arbitrarily effecting the right binding or the left binding on a bundle of sheets subjected to the covered binding without impairing the appearance of the document finished with the covered binding.

To accomplish the objects described above, this invention is directed to an image forming apparatus comprising an image data memory device for memorizing image data to be emitted on a sheet, an image processing device for changing the direction in which an image memorized in the image data memory device is emitted onto the sheet, an image producing device for producing an image on the sheet from the image data, a sheet accumulating device disposed on the downstream side of a conveying path for sheets emanating from the image producing device and adapted to accumulate a plurality of the emanating sheets, a cover storing device for storing a plurality of covers each having a fusible adhesive agent applied to the inside of the part of the back, a cover delivering device for extracting the covers one by one from the cover storing device, a cover supporting device for supporting severally the covers delivered from the cover delivering device in an opened state, a sheet delivering and inserting device for conveying the plurality of sheets from the sheet accumulating device and inserting them into the cover supported in an opened state by the cover supporting device, a heating device for warming the part of the back of the cover having inserted therein the plurality of sheets conveyed by the sheet conveying device thereby melting the fusible adhesive agent and inducing adhesion of the plurality of sheets to the cover, and a control device for controlling the image processing device so as to change the direction of the image emitted onto the sheet, depending on whether the sheets are to be joined to the cover on the right binding or the left binding.

To attain the objects mentioned above, this invention is directed to an image forming apparatus comprising an image reading device for reading an image on an original document, an image data memory device for memorizing as image data the image read by the image reading device, an image data processing device for processing the image data memorized by the image data memory device so as to change the direction of the image and the order of emission of the image on the basis of the image data thereby causing the image to be emitted as required onto a sheet, an output device for emitting the image data processed by the image data processing device onto the sheet, a sheet folding device for folding at least doubly the sheet emitted from the output device, an accumulating device for accumulating a plurality of sheets folded by the sheet folding device, a stapling device for binding a bundle of sheets accumulated by the accumulating device, and a controlling device for preparatorily selecting the position of binding to be used by the stapling device between the right binding and the left binding and then controlling the image data processing device so as to change the direction of the image and the order of emission of the image on the sheet, so as to enable the stapling treatment to be performed in the right binding or the left binding as selected.

Further to fulfill the objects mentioned above, the present invention is directed to an image forming apparatus comprising an image data memory device for memorizing image date to be emitted onto a sheet, an image processing device for changing the direction in which an image memorized by the image data memory device is emitted on the sheet, an image producing device for producing an image on the sheet from the image data, a sheet conveying device for conveying sheets into a cover, and a controlling device for controlling the image processing device so as to change the direction of the image emitted on the sheet, depending on the direction in which the sheets are received in the cover between the right binding and the left binding.

BRIEF DESCRIPTION OF THE DRAWINGS

FIG. 9 is a diagram to aid in the description of the operation of reading an original document in the copying machine.

FIGS. 10A and 10B are diagrams to aid in the description of the layout of memory of image data read out in the copying machine and a control table for controlling the memory layout.

FIGS. 18A and 18B are diagrams to aid in the description of a control table for effecting memory layout of the image data read out in the mode of 2-in-1 and management of the memory layout in the copying machine.

FIG. 19 is a diagram to aid in the description of an output designating table in the 2-in-1 right binding.

FIG. 21 is a diagram to aid in the description of an output designating table in the 2-in-1 left binding.

FIGS. 24A and 24B are diagrams to aid in the description of a control table for effecting memory layout of the image data read out in the mode of 1-in-1 and management of the memory layout in the copying machine.

FIG. 25 is a diagram to aid in the description of an output designating table in the 1-in-1 right binding.

DESCRIPTION OF THE PREFERRED EMBODIMENTS

Now, the embodiments of this invention will be described below with reference to the accompanying drawings.

[Embodiment 1]

In the following, the construction of a copying machine having a finisher mounted therein, the construction of the finisher, and the basic operations thereof will be described first. Then, binding operation and covered binding operation in the copying machine having the finisher mounted therein will be described.

Figure 1:
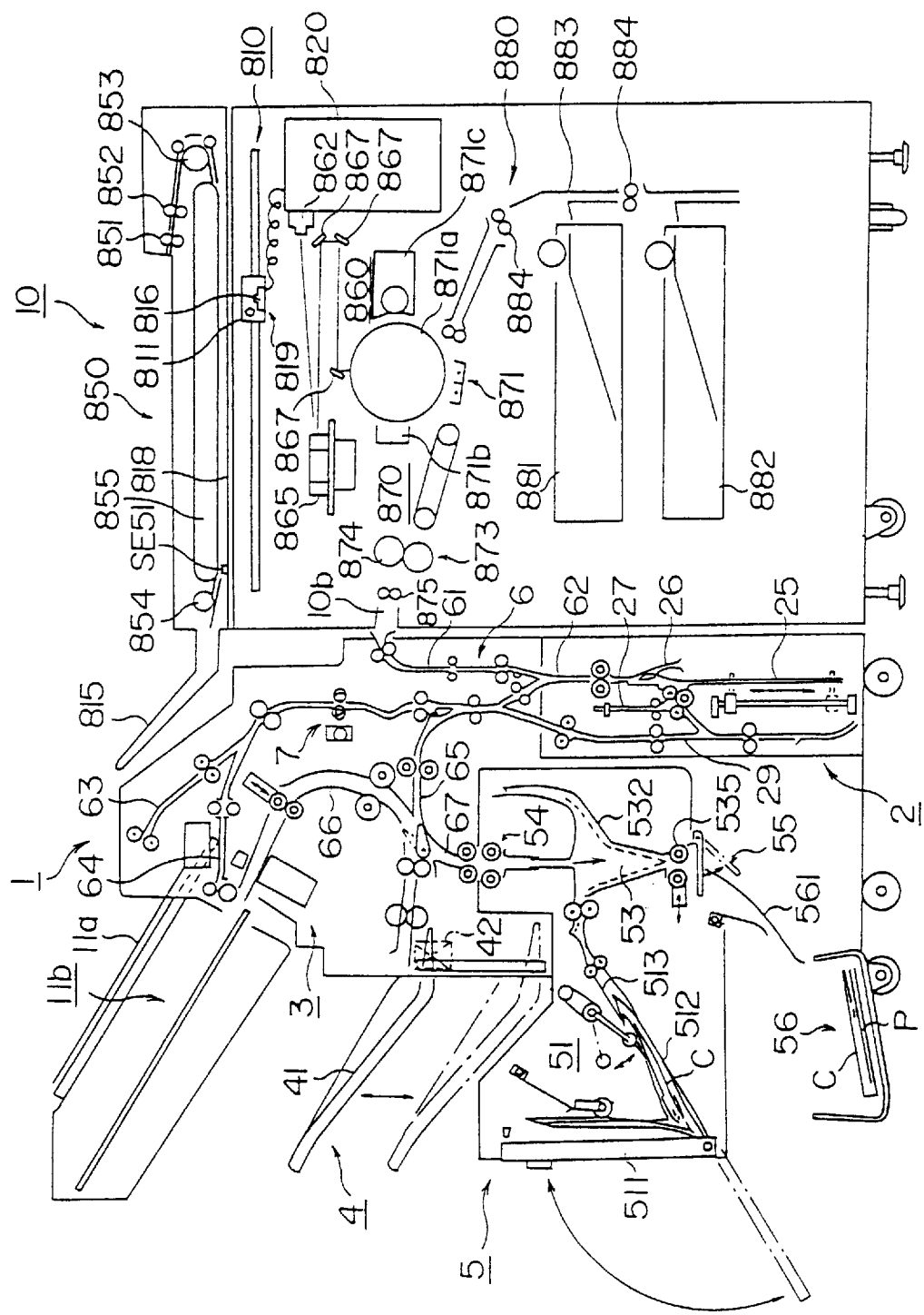
FIG. 1 is a diagram schematically illustrating the construction of a copying machine and a finisher which embody the present invention.
Figure 2:
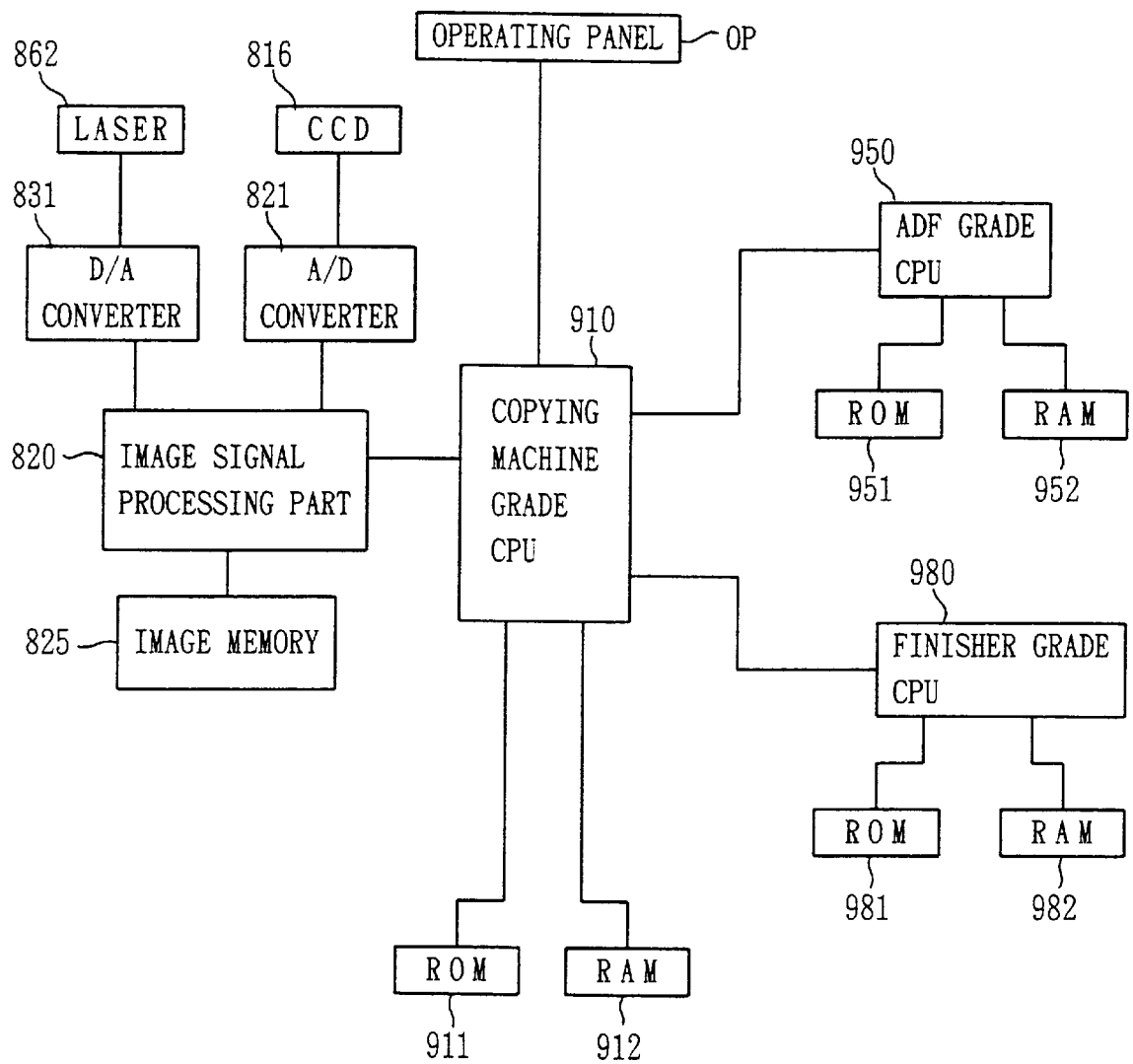
FIG. 2 is a block diagram to aid in the description of a control system for the copying machine and the finisher.

FIG. 1 is a schematic diagram to aid in the description of the whole construction of a copying machine having a finisher mounted therein and FIG. 2 is a block diagram of a control system.

A copying machine 10 is what is called a digital copying machine. It broadly comprises a scanning system 810 for reading an original document to be copied, an image signal processing part 820 for processing the image data read out, and an optical system 860 and an image producing system 870 for emitting the image data read out onto a sheet. An automatic document feeder (ADF) 850 for conveying the original document to be copied and optionally inverting the original document upside down is installed on the copying machine 10 and an operating panel OP for issuing commands such as an operating mode necessary for the various image compiling treatments to be performed by the copying machine 10 and a number of copies to be produced is disposed on the upper side of the copying machine 10.

Then, on this copying machine 10, a finisher 1 furnished with a sheet folding device 2, a stapling device 3, a binding device 5, and a punching device 7 as described herein below are mounted.

A control system for controlling the operation of the whole copying machine (inclusive of the ADF 850 and the finisher 1), as illustrated in FIG. 2, is composed of a copying machine grade CPU 910 for controlling the copying machine 10, an ADF grade CPU 950 for controlling the ADF 850, and a finisher grade CPU 980 for controlling the finisher 1. The CPU's are each provided with ROM's 911, 951, and 981 memorizing programs necessary severally for their functions and RAM's 912, 952, and 982 to be severally used by the CPU's for fulfilling various processings.

To the copying machine grade CPU 910 are connected the operating panel OP and the image signal processing part 820. The components of the copying machine 10 are operated by the commands from this copying machine grade CPU 910. Then, to the image signal processing part 820 are connected a CCD sensor 816 through the medium of an A/D converter 821 and a laser beam source 862 of the image producing system through the medium of a D/A converter 831. Further, an image memory 825 for memorizing an image data to be read out is mounted on the image signal processing part 820.

Now, the functions and operations of the components of the copying machine 10 will be described in detail below.

First, original documents set on an original document tray 815 of the ADF 850 are conveyed one by one to a prescribed position on a platen glass 818 in response to the command of the ADF grade CPU 950. After the original documents are read by the scanning system 810, they are discharged onto a discharged sheet tray on the ADF 850. The original documents are conveyed as original document conveying rollers 851, 852, 853, and 854 and a conveying belt 855 are driven.

During this conveyance of the original document, the size of this original document is detected based on the times at which a sensor SE51 installed in the ADF 850 is turned ON and OFF. The signals from the sensor SE51 are transmitted through the medium of the ADF grade CPU 950 to the copying machine grade CPU 910.

The scanning system 810 scans and reads the image on an original document as a scanner 819 driven by a scanner motor (not shown) is moved below the platen glass 818, an exposure lamp 811 mounted on the scanner 819 projects a beam of light on the original document laid on the platen glass 818, and a CCD 816 as a photoelectric converting element receives the reflected beam of light from the original document. This scanning system 810 relies on the copying machine grade CPU 910 to adjust the timing to drive the scanner 819 for the purpose of accomplishing the conveyance of the original document mentioned above and then the scanning of the original document so conveyed.

The signal which results from the photoelectric conversion performed by the CCD 816 of the scanning system 810 is converted by the A/D converter into a digital signal so as to be handled as digital data and introduced into the image signal processing part 820. In the image signal processing part 820, the digital signal is subjected to such image quality corrections as shading correction, modulation transfer function (MTF) correction, and gamma correction. The image data resulting from the image quality corrections is memorized in the form of code data in the image memory 825. Then, on the basis of the memorized image data, such image compilations as enlargement, contraction, and rotation of an image are carried out in compliance with an instruction from the copying machine grade CPU 910 as described herein below.

The image memory 825 is divided into a plurality of memory areas, allowed to memorize the code data which is a contracted image data, and enabled to effect simultaneous control of writing and reading. The memorized code data is managed by a managing table MT. The management of the image data will be described afterward in a paragraph referring to an image compiling treatment.

Such operations as the enlargement or contraction of an image and the rotation of an image are executed while the copying machine grade CPU 910 reads the code data memorized in the image memory 825 through the medium of the image signal processing part 820 and prints out the data with reference to an output designating table as will be explained herein below.

The image data which has undergone the image quality corrections and necessary image processing and compilation at the image signal processing part 820 is extracted from the image signal processing part 820 in response to the instruction of the copying machine grade CPU 910 based on the output designating table which will be described specifically herein below, converted into an analog data by the D/A converter 831, utilized to drive the semiconductor laser 862 in the optical system 860, and printed out in the form of an image on a sheet by a developing and transferring system 871 of the image producing system 870 by virtue of the laser beam from the semiconductor laser 862.

Incidentally, the optical system 860 is composed of the semiconductor laser 862, a polygon mirror 865 for deflecting the laser beam, and a reflecting mirror 867 and the image producing system 870 is composed of the developing and transferring system 871, a conveying system 880 for conveying a sheet, and a fixing system 873 for fixing the image. The developing and transferring system 871 is composed of a photosensitive drum 871a, an electric charger 871b, a developer 871c for storing a developer and supplying a toner to the photosensitive drum 871a, a transfer charger (not shown) for transferring a toner image on the photosensitive drum 871*a* onto the sheet, a separating charger (not shown) for separating the sheet from the photosensitive drum 871*a*, a cleaning blade (not shown) for removing the unnecessary toner, etc.

The conveying system 880 is composed of cassettes 881 and 882 for storing sheets, a sheet guide 883, a timing roller 884, etc. The sheets stored in the sheet cassettes 881 and 882 have prescribed sizes of their own depending on the sheet cassettes which hold the sheets. The sheet sizes, therefore, are rated by the cassettes to be selected for storing the sheets. Though the case, depicted above, uses two sheet cassettes, it is permissible to use still more sheet cassettes.

A fixing system 873 is composed of a fixing roller 874 for conveying a sheet while applying heat and pressure thereto, a discharging roller 875, and a discharge sensor (not shown) for detecting the discharge of the sheet.

The printed out sheet is forwarded from the sheet discharging part 10*b* to the finisher 1 which will be described specifically herein below.

Figure 3:
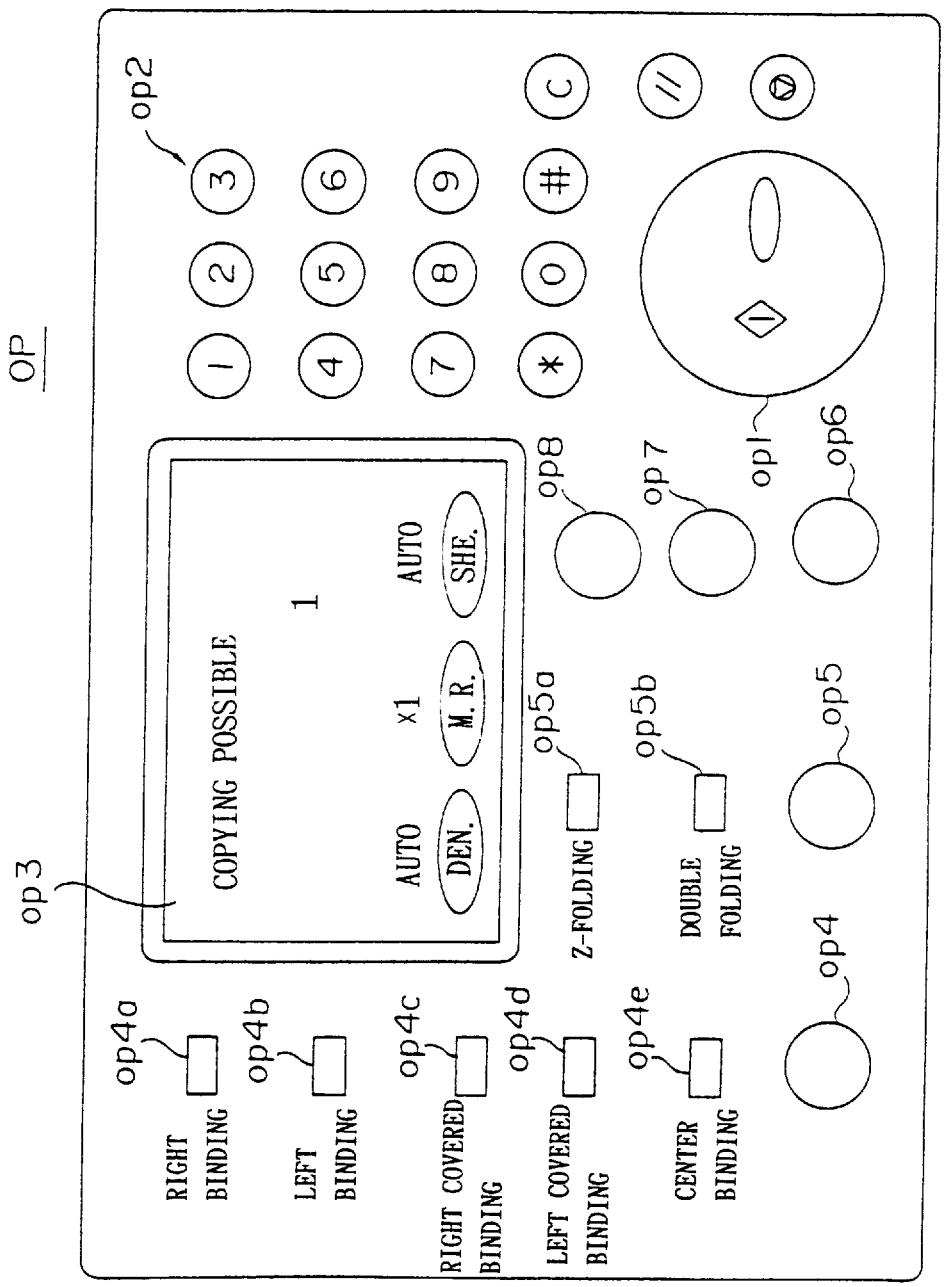
FIG. 3 is a diagram illustrating one example of an operating panel mounted on the copying machine.

The operating panel OP mounted on the copying machine 10, as illustrated in FIG. 3, is composed of a print key op1 for indicating the start of a copying operation, a ten key op2 for designating the number of copies, a liquid crystal display touch panel op3 for effecting display of messages and various settings, a select key op4 for selecting the form of binding a copied sheet and display lamps op4*a*, op4*b*, op4*c*, op4*d*, and op4*e* for indicating the state of the select key op4, a folding select key op5 for indicating the manner of folding a sheet and display lamps op5*a* and op5*b* for displaying the manner of folding, a bind key op6 for designating the binding, a punch key op7 for designating the manner of punching, a staple key op8 for designating the manner of stapling, etc. Various designations are emitted by proper combination of the operations of these keys. The binding is designated, for example, by depressing the bind key op6 and further manipulating the select key op4 for selecting between the right binding and the left binding. To effect the binding after a stapling treatment, the bind key op6 and the staple key op8 are depressed and further the select key op4 is manipulated to select between the right binding and the left binding to designate the binding in question. In the case of the covered binding, the select key op4 is manipulated to select between the right covered binding and the left covered binding. The stapling treatment alone is designated by the depression of the staple key op7 and the binding treatment is designated by depressing the bind key op6.

The control of the operating panel OP is attained by the copying machine grade CPU 910. The copying machine grade CPU 910 discerns inputs through the varying operating keys, executes relevant treatments, and produces the statuses of the treatments and various messages on the liquid crystal panel op3. In the case of binding, for example, a binding device which will be described specifically herein below is operated to prepare for binding sheets under the control of the finisher grade CPU 980.

The above are the basic functions and operations of the copying machine 10.

<<General structure of finisher>>

Figure 4:
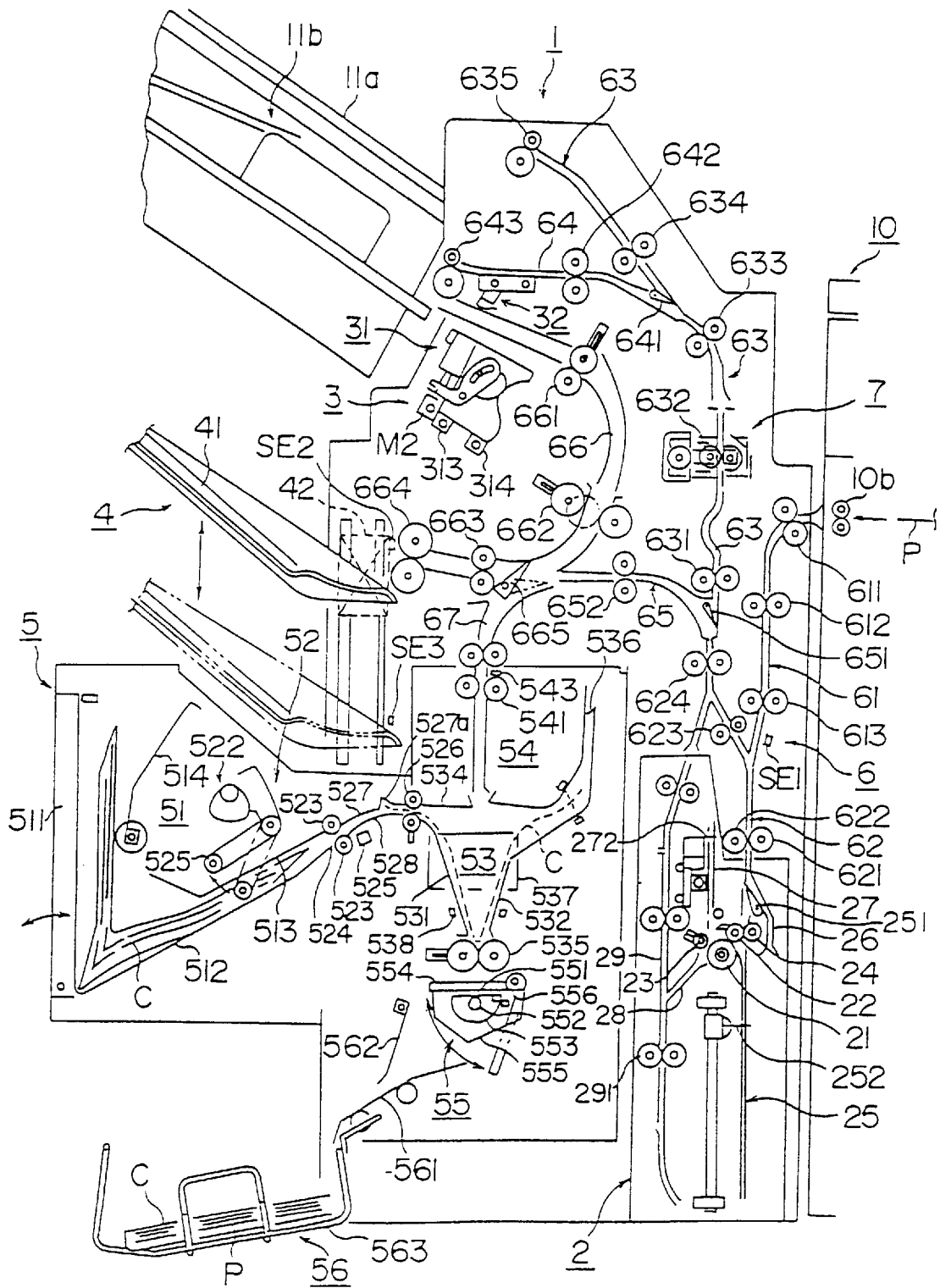
FIG. 4 is a diagram illustrating the construction of the finisher.

FIG. 4 is a diagram illustrating the construction of the finisher part. A finisher 1, as illustrated in FIG. 1 and FIG. 4, generally comprises a non-sorting tray 11*a* and a sheet accumulating part 11*b* for accumulating and aligning sheets P discharged from a sheet discharging part 10*b* of the copying machine 10, a sheet folding device 2 for optionally folding the sheet P discharged from the sheet discharging part 10*b* either doubly or triply in a cross section like a letter Z (hereinafter referred to as "Z-folding"), a stapling device 3 disposed on the downstream side of the sheet accumulating part 11*b* in the direction of conveyance of sheet and adapted to perform a stapling treatment on the accumulated and aligned sheets P, a sorting part 4 for receiving for storage a bundle of sheets resulting from the stapling treatment, a binding device 5 for attaching a cover to the bundle of sheets which has or has not undergone the stapling treatment, and a punching device 7 disposed in the sheet conveying path and adapted to punch the sheet P optionally. The sheets P discharged from the copying machine 10 are conveyed by the sheet conveying part 6 to various devices in the finisher 1.

<<Sheet conveying part>>

The sheet conveying part 6, as illustrated in FIG. 1 and FIG. 4, comprises a conveying path 61 for receiving the sheet P from the sheet discharging part 10*b* of the copying machine 10 and conveying it downward, a switchback conveying path 62 for inverting the sheet P longitudinally and upside down, a conveying path 63 for conveying the sheet P to non-sorting tray 11*a*, a conveying path 64 branched from the conveying path 63 and adapted to convey the sheet P to the sheet accumulating part 11*b*, a conveying path 65 branched nearly from the starting part of the conveying path 63 and adapted to convey the sheet P to the binding device 5 or the sorting part 4, and a conveying path 66 for conveying a bundle of sheets from the sheet accumulating part 11*b* to the sorting part 4 or the binding device 5. The sheet P is conveyed on the basis of the center of each of the conveying paths.

To be more specific, the conveying path 61 comprises paired conveying rollers 611, 612, and 613 as illustrated in FIG. 4. The switchback conveying path 62 comprises a conveying roller 621 capable of normal and reverse rotation, a follower roller 622 held in contact with the conveying roller 621 and enabled to rotate by following the conveying roller 621, paired conveying rollers 623 and 624 for conveying the sheet P which has been switched back to the conveying path 63, the conveying path 64, or the conveying path 65, and a sensor SE1 for detecting a sheet P.

The sheet P which has been conveyed down the conveying path 61 is first introduced into the switchback conveying path 62. When no folding is required, for example, the conveying roller 621 is switched to reverse rotation and the sheet P is conveyed upward from the switchback conveying path 62 to the conveying path 63 when a prescribed time passes after the detection of the trailing end of the sheet P by the sensor SE1, namely when the trailing end of the sheet P enters the conveying path 62.

The conveying path 63 is provided with paired conveying rollers 631, 632, 633, and 634 and paired discharging rollers 635. When the formation of a punched hole is designated, the punching device 7 punches a hole in the leading end part or the trailing end part of the sheet P.

The conveying path 64 is provided with a switch claw 641 for switching the destinations of the conveyance of the sheet P, paired conveying rollers 642, and paired discharging rollers 643 and adapted to discharge the sheet P into the non-sorting tray 11*a* or the sheet accumulating part 11*b*.

The conveying path 65 is provided with a switch claw 651 for switching the destinations of the conveyance of the sheet P and paired conveying rollers 652 and adapted to guide the sheet P directly to the binding device 5 or the sorting part 4 instead of conveying the sheet P to the sheet accumulating part 11*b*.

The switch claws 641 and 651 are severally rotated by solenoids (not shown) of their own. The sheet P which has been delivered through the switchback conveying path 62 is guided by the switch claw 651 to either of the conveying paths 63 and 65.

The sheets P which have been accumulated and aligned by the sheet accumulating part 11b are optionally subjected to the stapling treatment. When they are discharged without any further treatment, they are guided to the sorting part 4 through the conveying path 66 which has a relatively large dimension. In contrast, when they are to be bound, they are optionally subjected to the stapling treatment and then guided to the binding device 5 through the conveying path 66.

The conveying path 66 is provided with paired conveying rollers 661, 662, and 663 which are each enabled to be mutually separated and is further provided at the leading end thereof with a discharging roller 664.

<<Sorting part>>

The sorting part 4, as illustrated in FIG. 4, comprises a sorting tray 41 and a drive mechanism 42 for elevating the tray 41. During the production of numerous copied sheets, numerous sheets P are delivered one by one via the conveying path 65 or a bundle of numerous sheets forwarded from the sheet accumulating part 11b to the stapling device 3 and subjected therein to the stapling treatment is delivered via the conveying path 66 to this sorting tray 41. The lone sheet P or the bundle of sheets conveyed via the conveying path 65 or the conveying path 66 are guided by the switch claw 665 to the tray 41 or to the binding device 5.

Each time each of the sheets P received and accumulated in the tray 41 is detected by a sensor SE2, the tray 41 is lowered in a prescribed amount by the drive mechanism 42. When a sensor SE3 detects the fact that the tray 41 has descended to the lower limit, the copying operation is discontinued because the tray 41 is filled with the sheets to its full capacity. Since the construction of the drive mechanism 42 which lowers the tray 41 in the prescribed amount is widely known, it will be omitted from further description.

<<Sheet folding device>>

Figure 5:
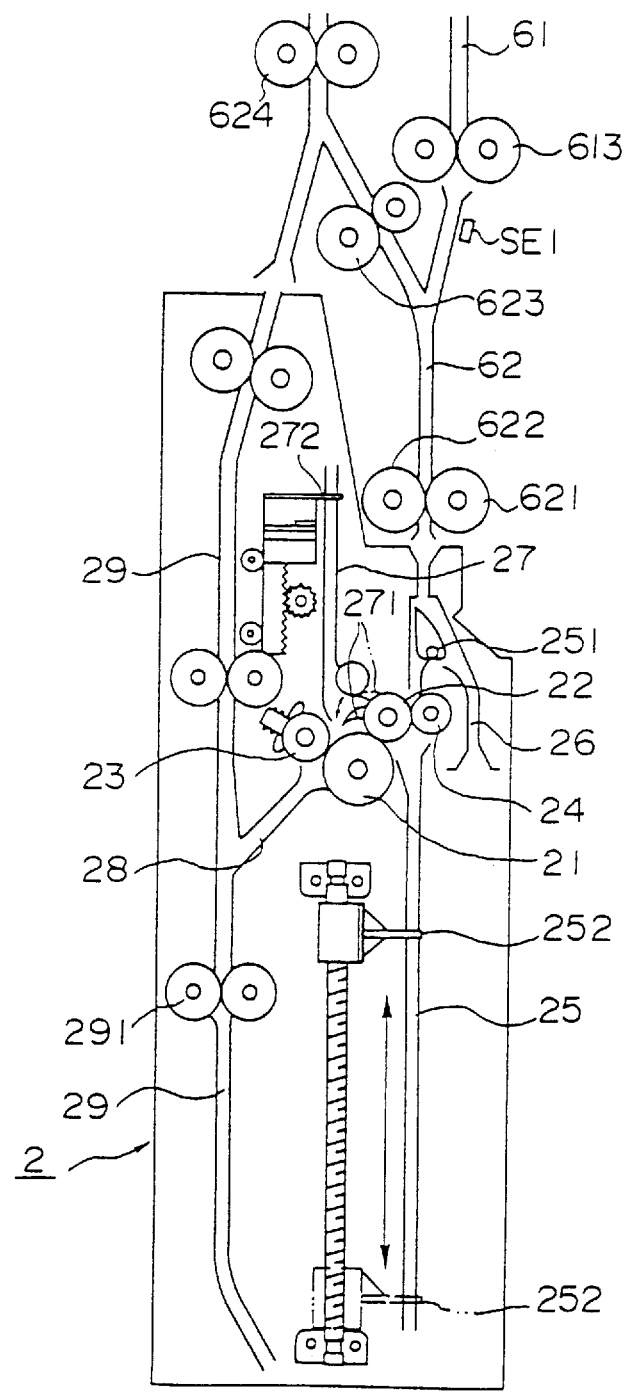
FIG. 5 is a diagram illustrating the construction of a sheet folding device provided for the finisher.

The sheet folding device 2, as illustrated in FIG. 1 and FIG. 5, is installed directly below the sheet conveying part 6 and is endowed with a function of doubly folding a sheet P bearing a formed image in the central part thereof in the direction of conveyance, a function of opening a doubly folded sheet P and imparting a crease of fold in the central part thereof, and a function of imparting a Z-folding to a sheet P.

It is three sheet folding rollers 21, 22, and 23 capable of normal and reverse rotation and a backup roller 24 that fulfill the central roles of the sheet folding device 2. The sheet P is delivered by a plurality of sheet conveying paths 25–29 which center around these rollers 21–24.

Now, the sheet folding will be given a general description.

The sheet folding device 2 is endowed with two sheet folding modes which are selected thereamong by the manipulation of the operating panel OP of the copying machine proper 10.

Z-folding mode

This mode consists in folding a sheet P in a cross section like a letter Z. The sheet P emitted from the sheet discharging part 10b and delivered through the conveying paths 61 and 62, as illustrated in FIG. 5, is conveyed by the paired switchback rollers 621 and 622 and passed through the switching member 251 and forwarded in the direction of the first conveying path 25. It is temporarily stopped by the sheet folding roller 22 and the backup roller 24 which are currently not in motion. Then, as the sheet folding roller 22 is set driving, the sheet P is conveyed until it collides against a stopper 252 which is set at a prescribed position. The sheet P, on colliding against the stopper 252, is caused to form a loop in the vicinity of the sheet folding rollers 21 and 22. The first folding of the sheet P is effected as the loop is engulfed by the nip of the sheet folding rollers 21 and 22.

The sheet P on which the first folding is completed is conveyed to the second conveying path 27 by the switching motion of a switching member 271 prompted by the signal of the copying machine 10 designating a Z-folding and advanced until it collides against a stopper 272. The sheet P stopped by the stopper 272 is caused to form a loop in the vicinity of the folding rollers 21 and 23. The second folding is effected as this loop is engulfed by the nip of the folding rollers 21 and 23. The sheet P which has acquired a Z-folding in consequence of the second folding is conveyed to the third conveying path 28 and further conveyed in the direction of the switchback conveying path 29, at which it is diverted by the inversion of the paired switchback rollers 291 and forwarded in the direction of the conveying path 63.

Double folding mode

This mode consists in doubly folding a sheet P in the central part thereof and is adopted in the case of a covered binding. In this mode, the first folding is effected through the same process as in the Z-folding mode excepting that the position of the first stopper 252 is different from that during the first folding operation in the Z-folding mode. The sheet P on which the first folding is completed is directly conveyed to the nip of the folding rollers 21 and 23 because the switching member 271 seated at the entrance to the second conveying path 27 is not rotated so as to guide the sheet P to the second conveying path 27. In short, when the sheet P is passed through the sheet folding rollers 21 and 22 and then immediately engulfed in the nip of the sheet folding rollers 21 and 23, it is conveyed without any other treatment to the third conveying path 28 and then advanced to the switchback conveying path 29, at which it is diverted by the paired switchback rollers 291 and consequently conveyed in the direction of the conveying path 63 similarly in the Z-folding mode. The side of the doubly folded sheet P which forms a crease of fold faces downward in the bearings of the diagram and the end part of the sheet P faces upward while the sheet is being conveyed. Incidentally, this double folding mode is not limited to the covered binding but is applicable to the center binding of the type used for a weekly magazine as well.

<<Stapling device>>

Figure 6:
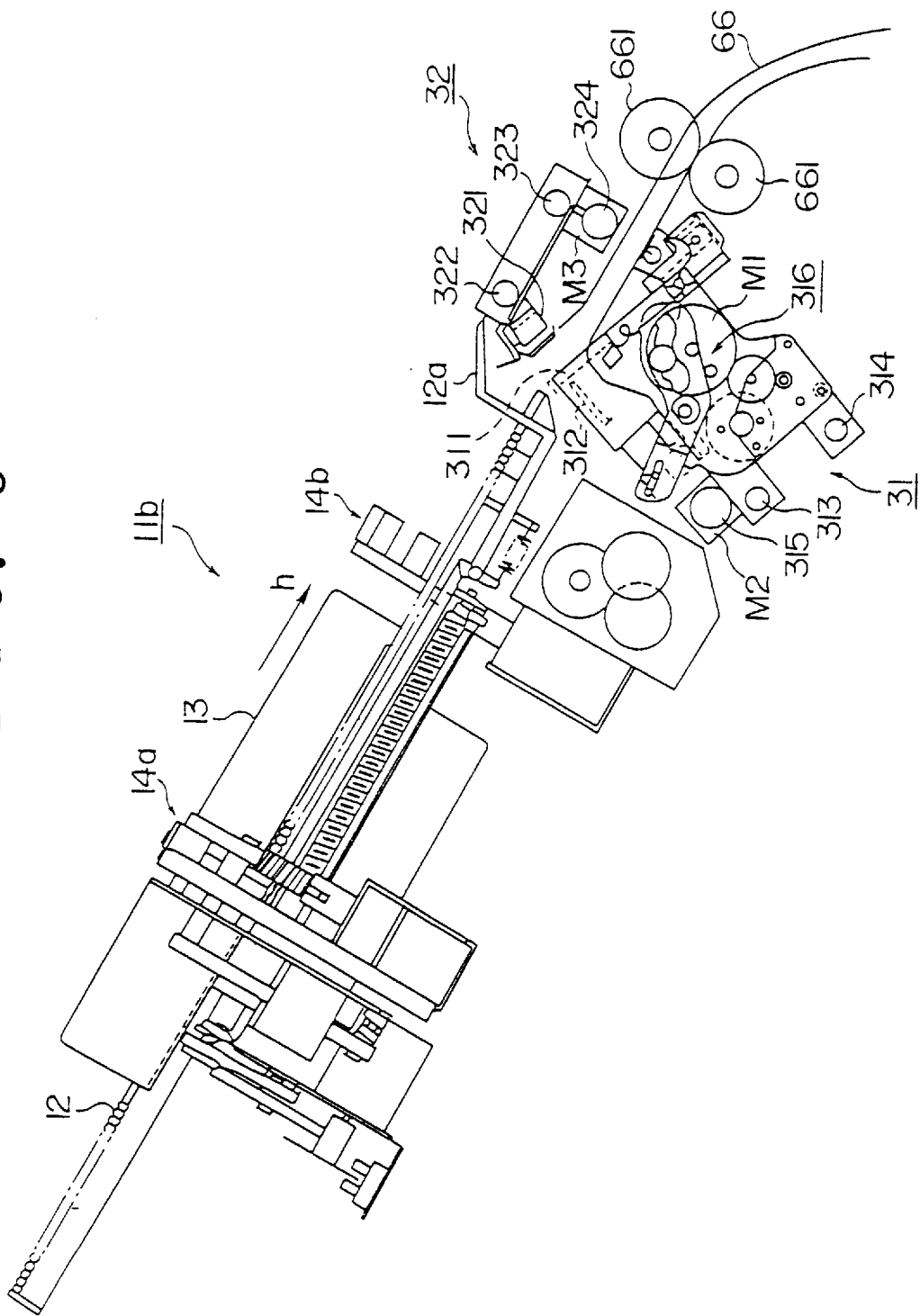
FIG. 6 is a diagram illustrating the construction of a stapling device provided for the finisher.

The stapling device 3, as illustrated in FIG. 4 and FIG. 6, consists in subjecting the sheet P emanating from the conveying path 64 mentioned above to an aligning treatment at the sheet accumulating part 11b and then performing a stapling treatment on the bundle of sheets at a prescribed position. It comprises a head unit 31 serving the purpose of ejecting a staple and an anvil unit 32 serving the purpose of receiving and bending the ejected staple.

The sheet accumulating part 11b aligns the sheets P in the lateral direction as the leading end stopper 12a receives and aligns the leading ends (trailing ends as viewed from the direction of discharge into the tray 12) of the sheets P discharged onto the tray 12 and a lateral aligning plate 13 reciprocates in a direction perpendicular to the direction of conveyance. Then, a first chuck device 14a and a second chuck device 14b take hold of the lateral part of the sheet P each time the sheet P is accumulated and aligned one by one and prevent the sheet P from floating up and, after the final sheet P is accumulated and aligned, the first chuck device 14a takes hold of a bundle of sheets and delivers it in the direction of the stapling device 3.

The head unit 31 severs the individual staples of a staple cartridge 311 one by one and thrusts them in the direction of the anvil unit 32 as a staple severing and bending member 312 is actuated through the medium of a cam link mechanism 316 which is driven by a motor M1. The anvil unit 32 is provided with a staple receiving member 321 serving the purpose of bending the staple in the shape of three sides of a square and binding the bundle of sheets. Since the functions of the head unit 31 and the anvil unit 32 belong to public domain (Japanese Patent Application No. 08-66,143, for example, refers), they will be omitted from further description.

The position for driving a staple in a direction perpendicular to the direction h of conveyance of sheet is attained by mounting the head unit 31 on two guide shafts 313 and 314 so as to be slid freely thereon and, at the same time, adapting the head unit 31 so as to be moved by causing a spiral shaft 315 laid in a direction perpendicular to the direction h of conveyance of sheet to be normally and reversely rotated by a stepping motor M2 and mounting the anvil unit 32 on two guide shafts 322 and 323 so as to be freely slide thereon and adapting the anvil unit 32 so as to be moved in a direction perpendicular to the direction h of conveyance of sheet in consequence of the normal and reverse rotation of a spiral axis 324 driven by a stepping motor M3.

The position for driving the staple in the direction of conveyance of sheet is decided by the motion imparted by the first chuck device 14a. The stapling treatment, therefore, can be performed on either the leading end or the trailing end of the bundle of accumulated sheets, depending on the amount of advance of the first chuck device 14a. When the bundle of doubly folded sheets is to be bound, the bundle is pushed out until the end part of the bundle (the leading end as viewed from the direction of discharge into the tray 12) reaches the position of the head unit 31.

The bundle of sheets, after undergoing the stapling treatment, is nipped by the paired conveying rollers 661 which can be separated from each other and then conveyed by the conveying path 66.

<<Binding device>>

Figure 7:
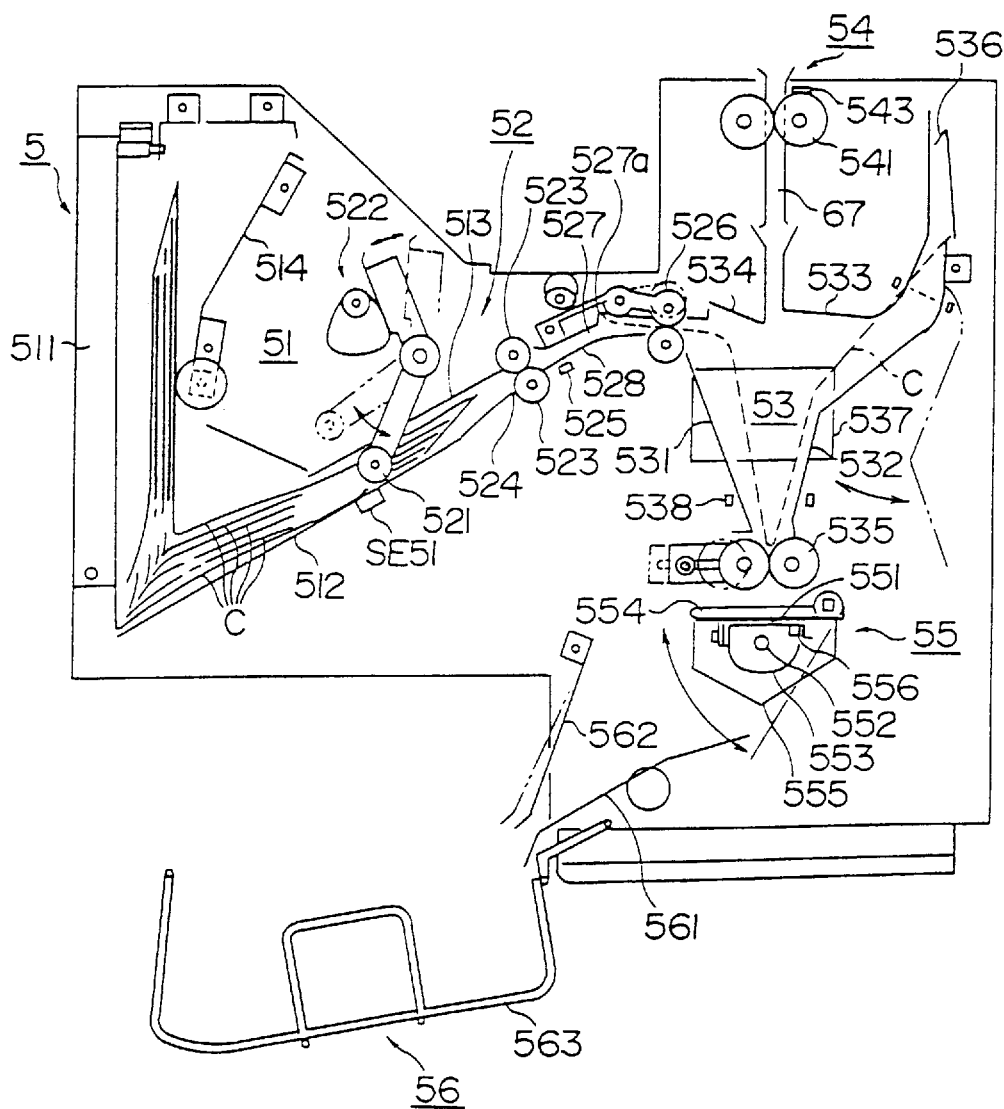
FIG. 7 is a diagram illustrating the construction of a binding device provided for the finisher.

The binding device 5 serves the purpose of bundling copied sheets and pasting the bundle by the use of a commercially available cover. This binding device 5, as illustrated in FIG. 1, FIG. 4, and FIG. 7, comprises a cover storing part 51 for storing a plurality of commercially available binding covers, a cover conveying part 52 for extracting the covers C one by one from the cover storing part 51 and putting them to conveyance, a sheet inserting part 53 for holding the covers C conveyed from the cover conveying part 52 in an opened state, a sheet conveying part 54 for inserting a bundle of sheets conveyed inside the conveying path 67 into a cover C, a heating part 55 for performing a heating treatment on the cover C which has admitted the sheet C at the sheet inserting part 53, and a discharging part 56 for discharging the bound cover C out of the binding device and receiving it for storage therein. Owing to this construction, the bundle of sheets which has been aligned in the sheet accumulating part 11b is forwarded, either without any further treatment or after undergoing the stapling treatment, to the binding device 5 via the conveying paths 66 and 67 and subjected to the binding treatment. Otherwise, the sheets are subjected to the sheet folding treatment by the sheet folding device 2 and then forwarded one by one via the conveying path 65 to the binding device 5, piled, and subjected to the binding treatment.

The cover storing part 51 comprises a switch door 511, a cover retaining member 514, and lower holding guides 512 and 513 and allows the covers C to be stored therein in an opened state, namely in the shape of a letter V (as illustrated in FIG. 4).

The cover conveying part 52 comprises a pickup roller 521 for permitting collision thereagainst of the back face of the cover C held therein and conveying the leading end of the cover C, a roller pressing member 522 for pressing the pickup roller 521 against the cover C, paired riffling rollers 523 for conveying only one cover C at a time, a front riffling member 524 disposed in the upstream of the paired riffling rollers 523, a cover detecting device 525 disposed in the downstream of the paired riffling rollers 523, paired cover conveying rollers 526 disposed in the downstream of the paired riffling rollers 523, and cover conveying guides 527 and 528 so constructed as to connect the cover storing part 51 and the sheet inserting part 53.

The sheet inserting part 53 is composed of guide plates 531, 532, 533, and 534 jointly forming an empty space of the shape of an inverted triangle for the insertion of sheet, paired cover resisting rollers 535 disposed below the empty space for the insertion of sheet, a leading end stopper 536 disposed above the empty space for the insertion of sheet in the direction of conveyance of the cover, and a lateral aligning member 537 disposed inside the empty space for the insertion of sheet above the paired cover resisting rollers 535.

The leading end of the cover C which has been conveyed from the cover conveying part 52 advances upward along the guide plate 532 and collides against the leading end stopper 536. As the cover C is further conveyed, the back part of the cover C is bent downward and passed between the guides 531 and 532 until the lower end thereof is stopped by the paired cover resisting rollers 535.

After the elapse of a prescribed time after the detection of the passage of the back part of the cover C by a cover detecting device 538 disposed above the paired cover resisting rollers 535 (at the time that the back part of the cover C collides against the upper sides of the paired cover resisting rollers 535 and the trailing end of the cover C exists in the upstream of the paired cover conveying rollers 526), at least the upper roller of the paired cover conveying rollers 526 is retreated out of the boundary of the cover conveying path.

In consequence of the retreat of the cover conveying roller 526 and by dint of the nerve of the front side of the cover C, the trailing end of the cover C is engaged with a depressed part 527a of the cover conveying guide 527 and the position of the trailing end of the cover C is consequently fixed. As a result, the cover C is set in the sheet inserting part 53 with the back part thereof mounted in the shape of a letter V on the paired cover resisting rollers 535 as indicated by a broken line in the diagram.

After the cover C has been set on the sheet inserting part 53, the lateral aligning member 537 is moved in a direction perpendicular to the direction of conveyance of the cover and enabled to press the end face of the cover C against an aligning basis plate (not shown) disposed as opposed to the lateral aligning member 537 and fix the position of the end face.

The sheet conveying part 54 is provided in the conveying path 67 extended to the upper part of the paired cover resisting rollers 535 with paired conveying rollers 541 for conveying a bundle of sheets to the sheet inserting part 53 and a detecting device 543 for detecting the bundle of sheets in the conveying path 67. The bundle of sheets conveyed by the paired conveying rollers 541, therefore, is allowed to fall under its own weight into the cover C which is opened upwardly in the sheet inserting part 53. This gravitational fall serves the purpose of aligning the joined end parts of the sheets.

The heating part 55 is composed of a heating plate 551 for heating the back part of the cover C set on the sheet inserting part 53, a heater 552 disposed below the heating plate 551, a reflecting plate 553 encircling the lower part of the heater 552 and shaped to concentrate the heat of the heater 52 on the heating plate 551, a heater supporting plate 554 for integrally supporting the heating plate 551, the heater 552, and the reflecting plate 553, an insulating member 555 mounted as a shield on the heater supporting plate 554, and a temperature detecting device 556.

In the sheet inserting part 53, as the bundle of sheets is inserted into the cover C, the paired cover conveying rollers 526 press the end part of the cover C and at least one of the paired cover resisting rollers 535 retreats from the empty space for the insertion of sheet. Then, the paired cover resisting rollers 535 are rotated normally and, at the same time, the paired cover conveying rollers 523 are rotated to forward the cover C and the bundle of sheets to the heating part 55 below the sheet inserting part 53, stop the driving of the paired cover conveying rollers 526 and the paired cover resisting rollers 535, separate the paired cover conveying rollers 526 from each other, and cause the paired cover resisting rollers 535 to press the cover C and the bundle of sheets. This operation further aligns the end part of the bundle of sheets inside the cover C.

After the aligning operation is completed, the back part of the cover C on the heating plate 551 is heated at a proper temperature for a prescribed period with the cover C and the bundle of sheets kept under the pressure of the paired cover resisting rollers 535. Consequently, the adhesive agent applied fast to the back part of the cover C is melted and the cover C is joined by adhesion to the bundle of sheets. Thereafter, at the time that has been predicted as infallibly terminating the adhesion of the cover C and the bundle of sheets, the cover C and the bundle of sheets are discharged by normally rotating the paired cover resisting rollers 535.

The discharging part 56 is composed of a discharging guide 561, a blocking plate 562, and a discharging tray 563. The cover C which has been conveyed from the heating part 55 slides down the surface of the inclined discharging guide 561 under its own weight and is received in the discharging tray 563.

The above is the construction of the finisher.

<<Binding operation>>

The binding operation produced in the copying machine furnished with the finisher described above will be explained below.

Figure 8:
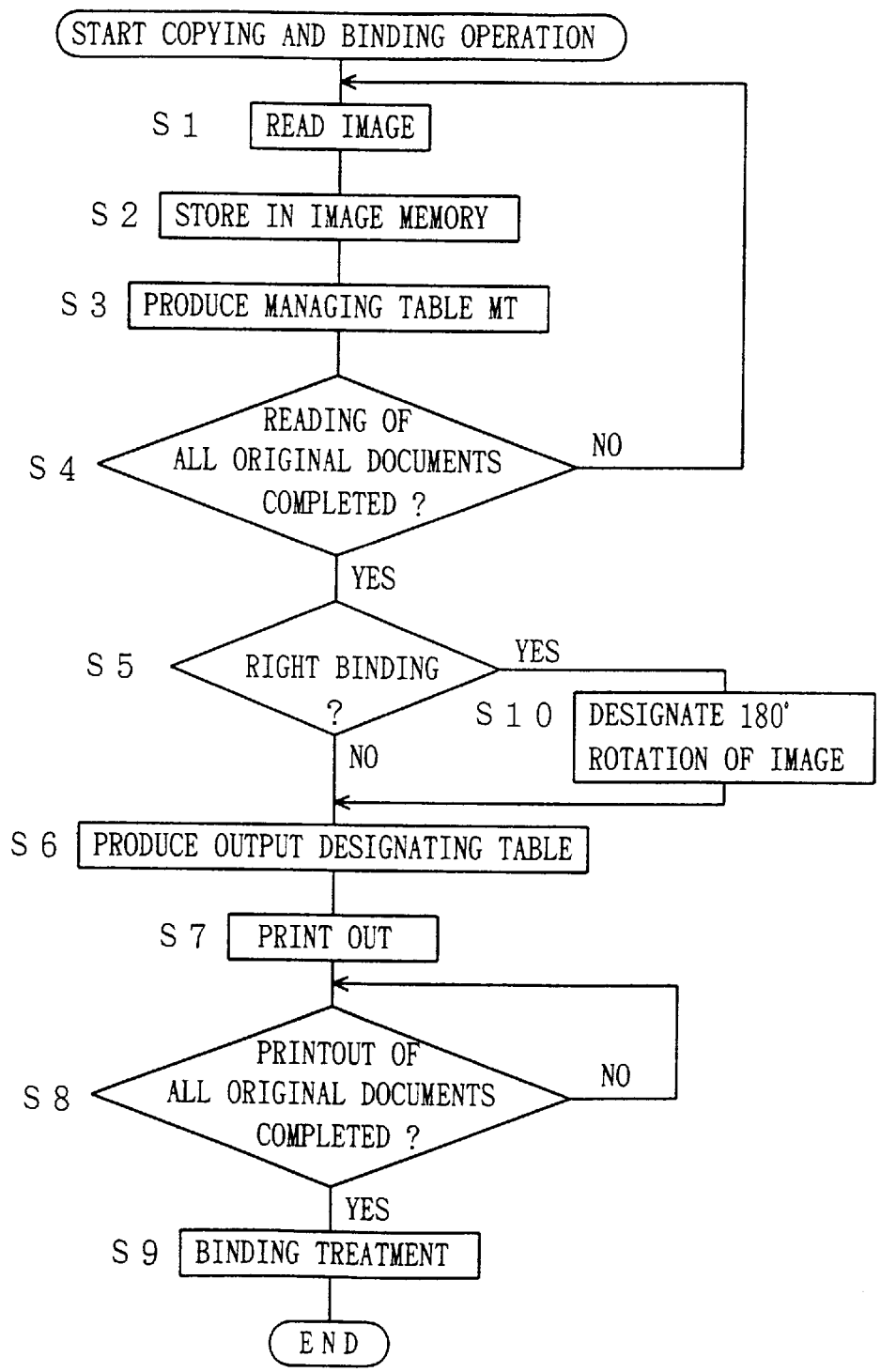
FIG. 8 is a flow chart showing the procedure of an image processing during the copying and binding operation in the copying machine.

FIG. 8 is a main flow chart showing the copying and binding operation. The original documents set in the ADF 850 are sequentially conveyed from the first page onward and passed through the steps of reading an image and introducing the read image into the machine (S1). The introduced image data is stored in the image memory 825 (S2). Consequently, a managing table MT for managing the layout of the image data in the memory is produced (S3). The operation of S1–S3 mentioned above is executed on all the original documents set in the ADF 850 (S4).

Then, the judgment about the mode of binding, between the right binding and the left binding, is effected (S5) in response to a designation from the operating panel OP. When the right binding has been selected, the present embodiment designates a rotation of the image by 180° (S10), depending on the construction of the conveying paths and the construction of the binding device, and advances the process to the production of an output designation table (S6). In contrast, when the right binding has not been selected (or the left binding has been selected), the process is moved without any treatment to the production of an output designation table (S6). The production of the output designation table will be specifically described herein below.

Then, a print is produced on a sheet based on a designation of the produced output designation table (S7). The sheet on which the print is produced is placed for storage in the sheet accumulating part 11b. The sheets stored are examined to judge whether or not all the pertinent original documents have been printed out (S8) and, when the judgment is affirmative, they are bound by the binding device 5 mentioned above (S9).

This compilation of images has bearing on the direction in which the copying machine reads the images and the direction in which the sheets are conveyed during the course of printing.

First, as respects the direction in which the images are read out, the original documents in the present embodiment are read out by being scanned in the main scanning direction and the auxiliary scanning direction indicated in FIG. 9. The image data, therefore, is memorized in the image memory 825 such that the part indicated in the diagram as the starting point for reading is memorized as the first address and the part indicated as the terminating point for reading is memorized as the last address. Here, the main scanning direction is the direction in which the picture elements (photodiodes) of the CCD 816 are arranged and the auxiliary scanning direction is the direction in which the scanner 819 is moved.

The image data thus read out of each of the original documents, A4 in size of sheet, is stored in each of the plurality of areas produced by dividing the image memory 825 as shown in FIG. 10A. The image data thus stored in the areas in the image memory 825 is managed by the managing table MT. The managing table MT, as illustrated in FIG. 10B, stores the numbers designating the areas in the image memory 825, the original document serial numbers assigned sequentially to the original documents to be introduced, the numbers of connected areas, and, as additional information, various types of information necessary for the treatments of contraction and elongation such as the mode of contraction and the length of data. The former connection shown in FIG. 10B indicates the connection in the forward direction and the fact that the pertinent area is or is not the first area when one introduced original document is memorized in two or more areas, the two digits, "00", denoting the first area and other two digits denoting the numbers of the respectively preceding areas. By the same token, the latter connection indicates the connection in the backward direction and the fact that the pertinent area is or is not the last area, the two alphabetic characters, "FF", denoting the last area and other two digits denoting the numbers of the following areas. In the present case, the former connections are invariably denoted by "00" and the latter connection by "IFF" because the image data of one original document, A4 in size of sheet, is completely stored in one area.

It is the output designating table produced at the step S6 mentioned above that is referred to when the image data thus memorized is printed out.

Figures 11, 12:
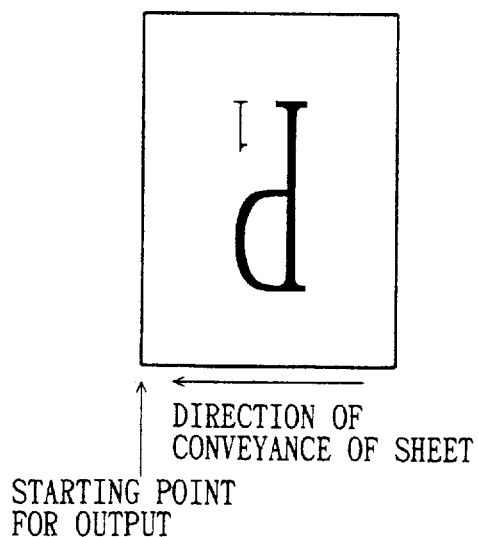
FIG. 11 is a diagram to aid in the description of an output designation table for the right binding.
FIG. 12 is a diagram to aid in the description of the result of a sheet emission in the right binding.

First, in the output designating table used in the case of the right binding mode, the image data read out of the original documents is arranged in response to the designation of 180° rotation of image issued at the step S10 mentioned above so as to be emitted sequentially from the area 01 storing No. 1 as the order of reading the original documents and the designation of 180° rotation is memorized as additional information in each of the areas, as illustrated in FIG. 11.

The printing of the image data is carried out on the basis of this output designating table. The output in this case is an inverted image as illustrated in FIG. 12. In this embodiment, therefore, the image is produced in the normal position on the sheet such that the end part on the right side of the sheet hits the part of the back of the cover. At this time, the images are printed out as rotated by 180° when the image data for the printing is read out sequentially from the last address backward.

Incidentally, in the output designating table illustrated in the diagram, the number of the former connection to be designated is "00" when a plurality of areas exist for the production of images on one sheet and no number exists for an area to be used before that. Then, the number of the latter connection to be designated is "FF" when a plurality of areas exist for the production of images on one sheet and no number exists for an area to be used after that.

Figures 13, 14:
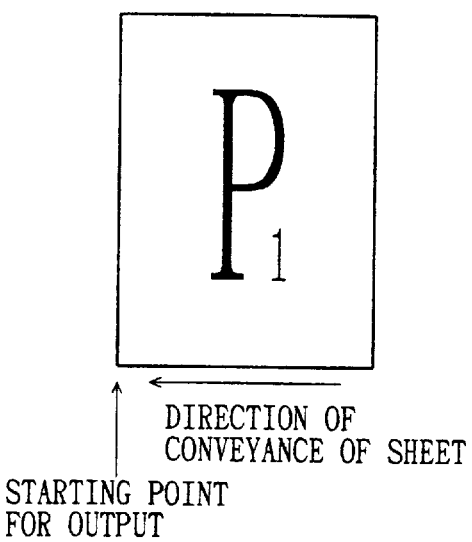
FIG. 13 is a diagram to aid in the description of an output designating table in the left binding.
FIG. 14 is a diagram to aid in the description of the result of a sheet emission in the left binding.

Then, in the left binding mode, since no designation is made as for the rotation of an image, the output designating table to be produced is such that the image data is simply arranged so as to be emitted sequentially from the area 01 memorizing No. 1 as the order of reading the original documents as illustrated in FIG. 13. In the sheet which is printed consequently, the image is normally positioned as illustrated in FIG. 14. The sheet on which the image is normally positioned is produced such that the left side edge part thereof collides against the part of the back of the cover.

Figure 29A:
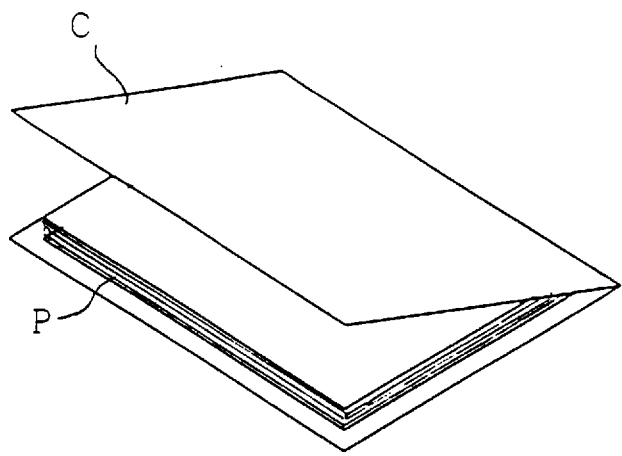
FIGS. 29A and 29B are diagrams to aid in the description of the right binding and the left binding of a document finished by binding.
Figure 29B:
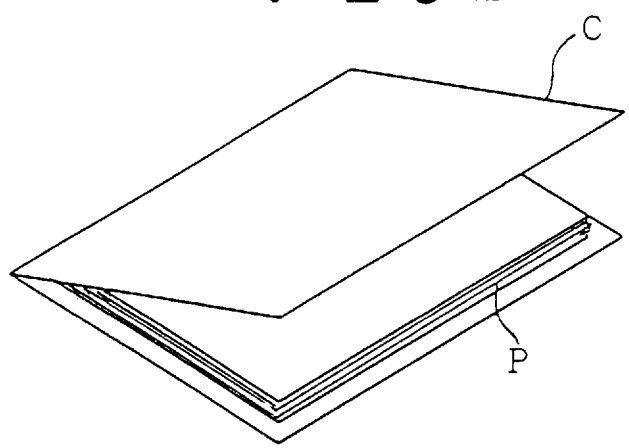

As a result, the right binding and the left binding illustrated respectively in FIG. 29A and FIG. 29B can be attained arbitrarily and easily.

Though Embodiment 1, as described above, provides a copying machine with a finisher, this invention does not preclude the provision of a finisher for a printer which is connected to a computer, for example. In this case, the choice between the right binding and the left binding can be easily attained by changing the direction of the image emitted from the printer so as to suit the right binding or the left binding.

[Embodiment 2]

Now, the operation of covered binding which embodies this invention will be described below. Since the copying machines provided with a finisher and used in Embodiment 2 is identical with that used in Embodiment 1, the constructions of the finisher and the copying machine will be omitted from the following description. The description which follows, therefore, concerns exclusively the operation of covered binding.

Figure 15:
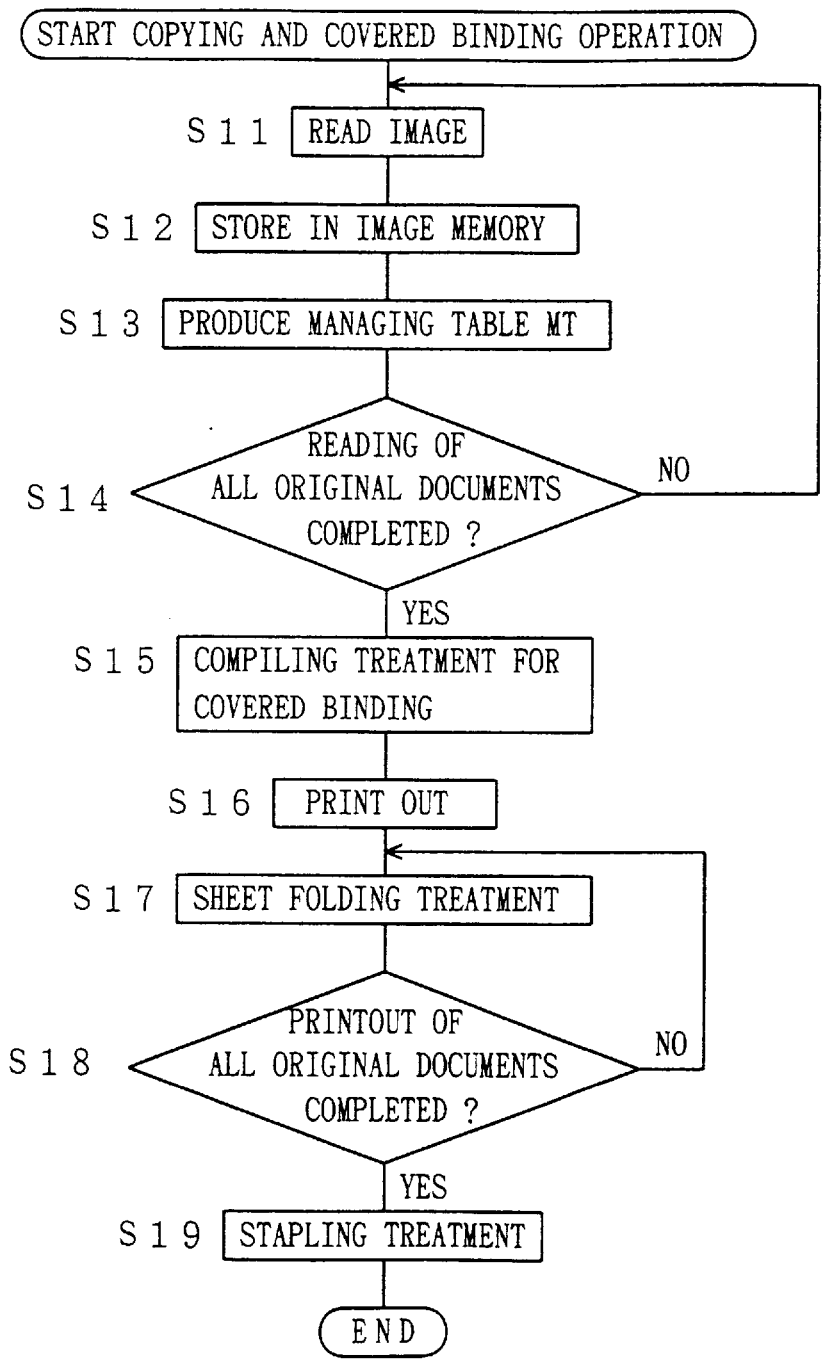
FIG. 15 is a main flow chart illustrating the procedure of an image processing during the copying and covered binding operation in the copying machine.

FIG. 15 is a main flow chart of the operation of copying and covered binding. First, the original documents set in the ADF 850 are sequentially forwarded from the first page and the images thereon are read out and introduced as required (S11). The image data thus introduced are memorized in the image memory 825 (S12). The managing table MT (FIG. 10 refers) for managing the layout of the image data in the memory is consequently produced (S13). The operations of S11–S13 mentioned above are executed on each of the original documents set in the ADF 850 (S14).

The image data memorized in the image memory 825 is subjected to a compiling treatment for the purpose of the covered binding (S15). The compiling treatment for the covered binding will be specifically described herein below. Here, the output designating table to be used in designating the print output depending on the right binding or the left binding is produced.

Next, a print is produced on the sheet on the basis of the designation of output decided by the compiling treatment for the covered binding (S16). The sheet on which the print has been produced is doubly folded by the sheet folding device 2 mentioned above and placed for storage in the sheet accumulating part 11b (S17). Then, the decision whether or not all the original documents have been printed out is made (S18) and, when the judgement is affirmative, the sheets bearing the prints are stapled by the stapling device 3 mentioned above and the stapled booklet is discharged into the tray 41 (S19).

Figure 16:
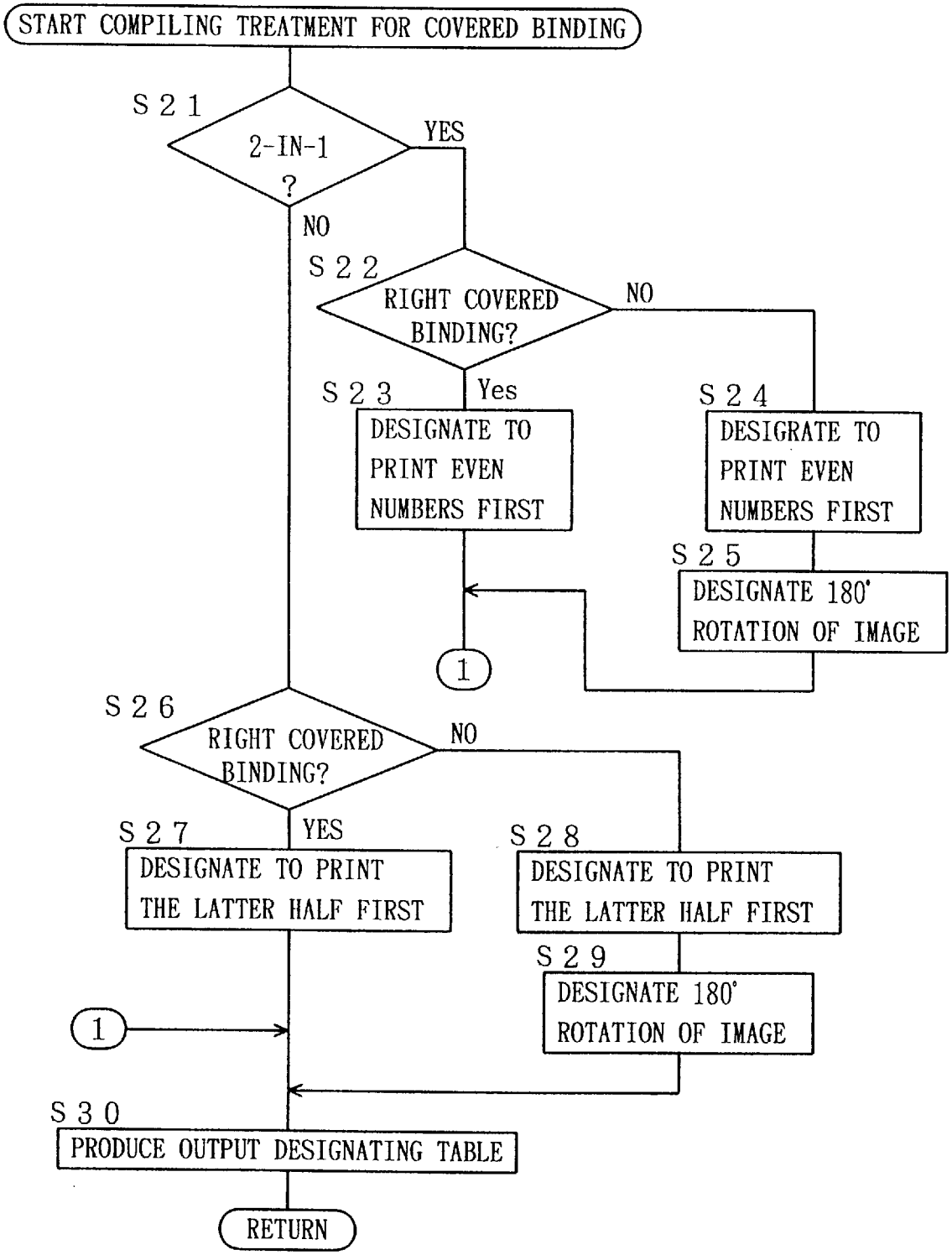
FIG. 16 is a flow chart of a processing routine for the compilation in covered binding shown in the main flow chart.

FIG. 16 is a flow chart showing the procedure of the compiling treatment for the covered binding. First, the two modes for the covered binding are subjected to discrimination (S21) The two modes are a mode which consists in copying two original documents on one sheet, doubly folding the sheet, and finishing the folded sheet in covered binding (called 2-in-1) and a mode which consists in copying on one sheet one master original document having two pages of images printed from the beginning on one original document, doubly folding the sheet, and finishing the folded sheet in covered binding (called 1-in-1). The selected mode is set by the touch panel op3 in conjunction with the covered binding mode which is set by the select key op4.

When the judgment confirms the 2-in-1 mode, the decision whether or not the right binding is required is made (S22). When the judgment confirms the right binding, a designation to print images bearing even ordinal numbers first is issued (S23). When the judgment denies the right binding (in the case of the left binding), a designation to print images bearing even ordinal numbers first is issued (S24) and, at the same time, a designation to rotate images by 180° is issued (S25). These designations participate in the production of the output designating table at the step S30.

When the judgment at the step S21 denies the 2-in-1 mode (in the case of the 1-in-1 mode), then a decision whether or not the right binding is required is made (S26). When the judgment confirms the right binding, a designation to print first the images in latter half of the one original document read out, namely the image on the second page of the sheet finished in covered binding, is issued (S27). When the judgment conversely denies the right binding (in the case of the left binding), a designation to print first the images in latter half of the one original document read out is issued (S28) and, at the same time, a designation to rotate the image by 180° is issued (S29). These designations participate in the production of the output designating table at the step S30.

This compilation of images has bearing on the direction in which the copying machine reads the images and the direction in which the sheets are conveyed during the course of printing.

Figure 17:
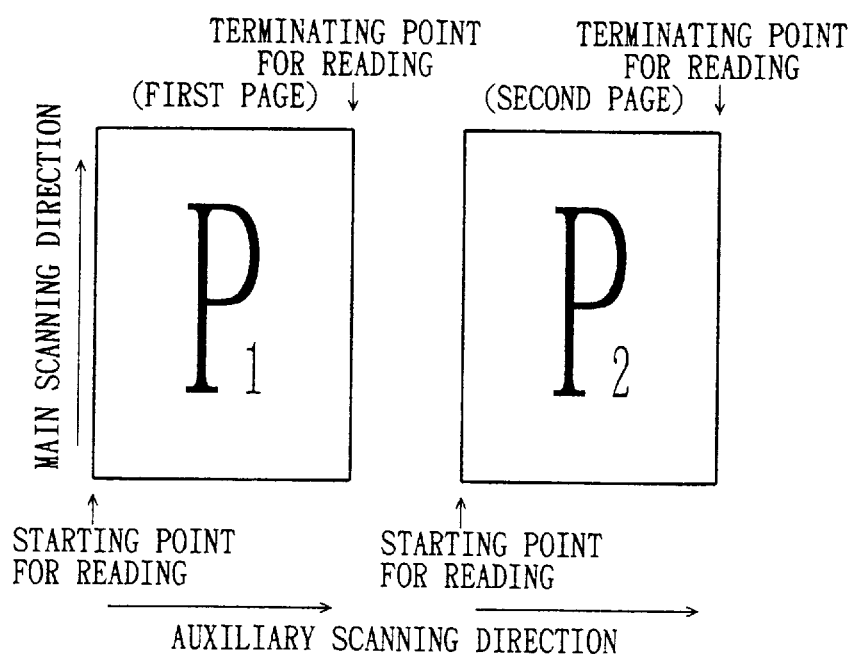
FIG. 17 is a diagram to aid in the description of the 2-in-1 reading of original documents in the copying machine.

First, as respects the direction in which the images are read out, two original documents in the present embodiment using the 2-in-1 mode are read out sequentially in the order of pages by being scanned in the main scanning direction and the auxiliary scanning direction as illustrated in FIG. 17.

The image data, therefore, is memorized in the image memory 825 such that the part indicated in the diagram as the starting point for reading is memorized as the first address and the part indicated as the terminating point for reading is memorized as the last address. Here, the main scanning direction is the direction in which the images of the CCD 816 are read in and the auxiliary scanning direction is the direction in which the scanner 819 is moved.

The image data thus read out of each of the original documents, A4 in size of sheet, is stored in each of the plurality of areas produced by dividing the image memory 825 as illustrated in FIG. 18A. The image data thus stored in the areas in the image memory 825 is managed by the managing table MT. The managing table MT, as illustrated in FIG. 18B, stores the numbers designating the areas in the image memory 825, the original document serial numbers assigned sequentially to the original documents to be introduced, the numbers of connected areas, and, as additional information, various types of information necessary for the treatments of contraction and elongation such as the mode of contraction and the length of data. The former connection shown in FIG. 18B indicates the connection in the forward direction and the fact that the pertinent area is or is not the first area when one introduced original document is memorized in two or more areas, the two digits, "00", denoting the number of the first area and other two digits denoting the numbers of the respectively preceding areas. By the same token, the latter connection indicates the connection in the backward direction and the fact that the pertinent area is or is not the last area, the two alphabetic characters, "FF", denoting the last area and other two digits denoting the numbers of the following areas. In the present case, the former connections are invariably denoted by "00" and the latter connection by "FF" because the image data of one original document, A4 in size of sheet, is completely stored in one area.

It is the output designating table produced at the step S30 mentioned above that is referred to when the image data thus memorized is printed out.

First, the output designating table used in the case of the 2-in-1 right binding mode issues a designation to print first the area 02 containing the image data of the original document of No. 2 (the former connection "00") and subsequently designates the area 01 containing the original document of No. 1 (the formation of images of one output sheet completed with the latter connection "FF") as illustrated in FIG. 19 because a designation to print first the images bearing even ordinal numbers has been issued as in the procedure of the routine for the treatment of image compilation mentioned above. The number of the former connection to be designated is "00" when a plurality of areas exist for the production of images on one sheet and no number exists for an area to be used before that. Then, the number of the latter connection to be designated is "FF" when a plurality of areas exist for the production of images on one sheet and no number exists for an area to be used after that.

Figure 20A:
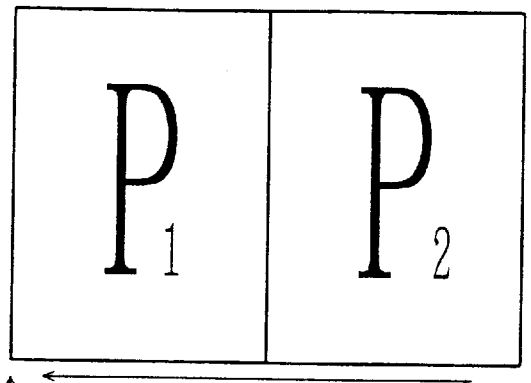
FIGS. 20A and 20B are diagrams to aid in the description of the result of a sheet emission in the 2-in-1 right binding and the result after the sheet folding.
Figure 20B:
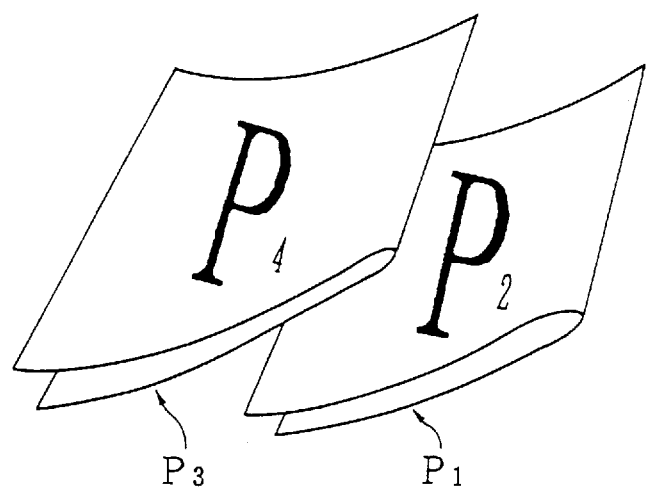
Figure 30A:
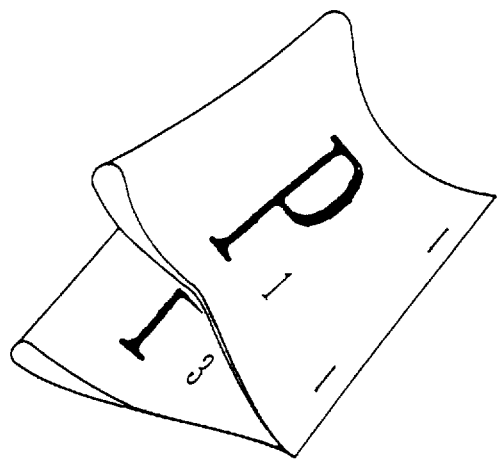
FIGS. 30A and 30B are diagrams to aid in the description of the right covered binding or the left covered binding of a document.

The printing of the image data is carried out on the basis of this output designating table. In the case of the right binding, since the image of the original document of No. 2, namely the second page, in the direction of conveyance of sheet is printed first on one sheet as illustrated in FIG. 20A, the folded sheets are accumulated in the sheet accumulating part 11b of the finisher 1 such that the first page assumes the lowermost position as illustrated in FIG. 20B. A booklet of right binding as illustrated in FIG. 30A is finished when the end parts (the sides having no crease of fold) of the sheets accumulated in the state mentioned above are bound by stapling. At this time, the images do not need to be subjected to a rotating treatment because the starting point of print output (FIG. 20A refers) coincides with the starting point for reading the second page of the original document (FIG. 17 refers). It, therefore, suffices to read the image data of the original documents sequentially from the first address onward and print it out.

The output designating table to be used in the 2-in-1 left binding issues a designation to print first the area 02 containing No. 1 (second page) and subsequently the area 01 containing No. 1 and, at the same time, issues a designation to rotate the image by 180° and change the direction of the image as an additional information for each of the designations, as illustrated in FIG. 21.

Figure 22A:
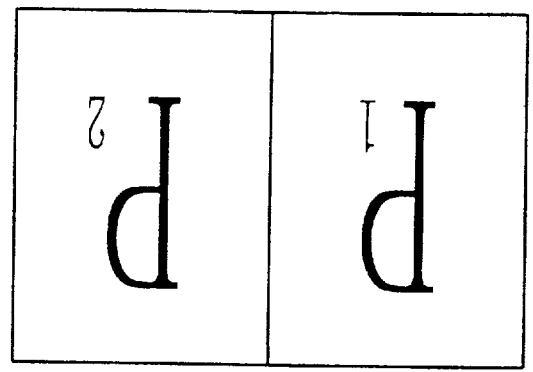
FIGS. 22A and 22B are diagrams to aid in the description of the result of a sheet emission in the 2-in-1 left binding and the result after the sheet folding.
Figure 22B:
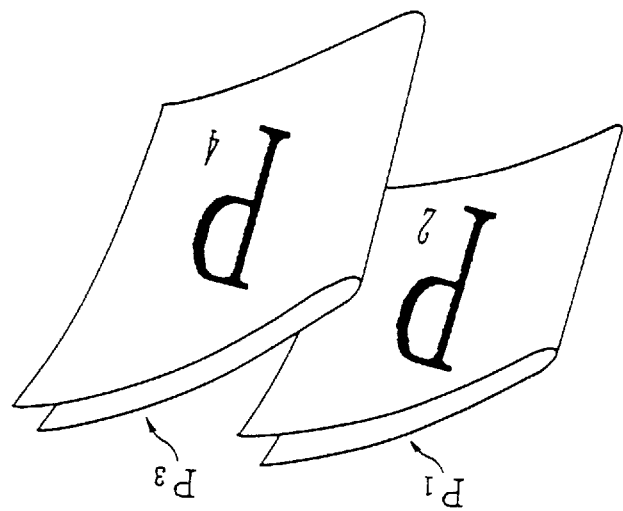
Figure 23:
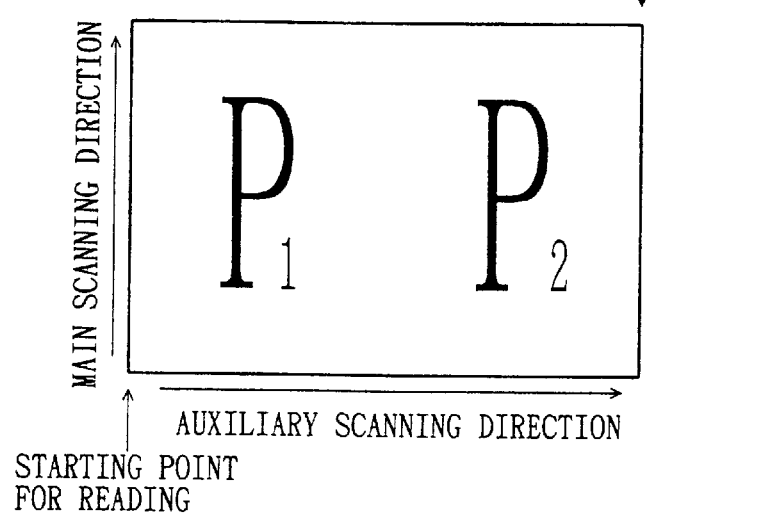
FIG. 23 is a diagram to aid in the description of the reading of an original document in the 1-in-1 mode in the copying machine.
Figure 30B:
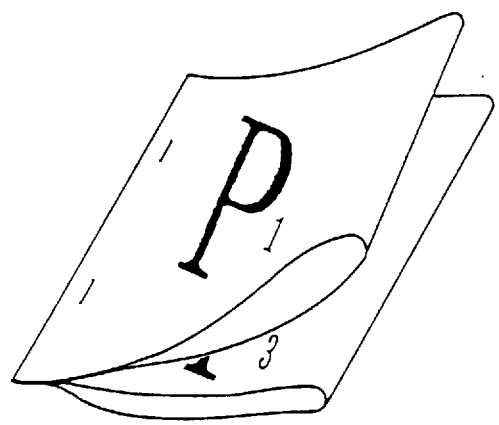
Figure 31:
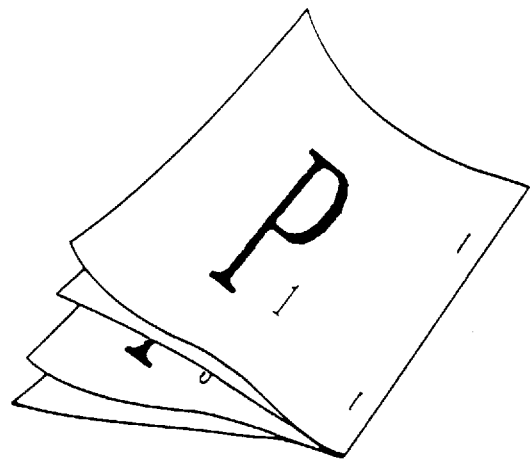
FIG. 31 is a diagram to aid in the description of an inconvenience encountered in the right covered binding or the left covered binding of a document.
Figure 32:
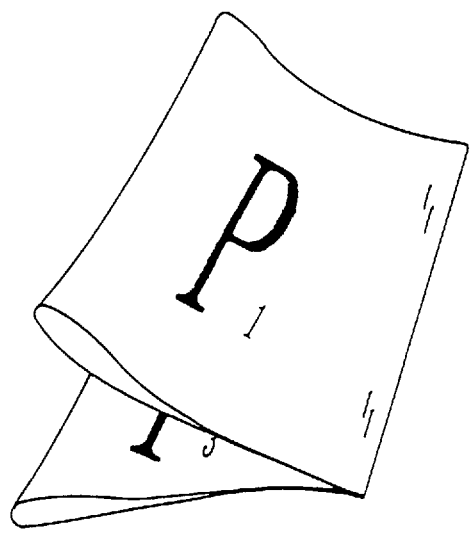
FIG. 32 is a diagram to aid in the description of an inconvenience encountered in the right covered binding or the left covered binding of a document.

As respects the printout, the second page in the direction of conveyance of sheet is first printed on one sheet and the image is inverted in the case of the right binding as illustrated in FIG. 22A. The folded sheets presently bearing the prints are sequentially accumulated in the sheet accumulating part 11b of the finisher 1 such that the first page occupies the lowermost position (the direction of the image inverted in the case of the right binding) as illustrated in FIG. 22B. A booklet of left binding is finished as illustrated in FIG. 30B when the end parts (the sides having no crease of fold) of the sheets accumulated as described above are bound by stapling. In this case, the starting point for printing out (FIG. 22A refers) is different from the starting point for reading out the original document (FIG. 17 refers). Thus, a print rotated by 180° is produced by reading out the image data sequentially from the last address backward and printing out the image data so read out.

In the present embodiment, since the staples are driven in the bundle of accumulated sheets from below by the stapling device 3 as illustrated in FIG. 20B and FIG. 22B, the staples enter the sheets from the first page downward and cannot impair the appearance of the finished booklet.

Next, the output in the case of the 1-in-1 mode is basically identical with that in the case of the 2-in-1 mode described above. First, the master original documents having two pages full of images drawn on one original document are read out by being scanned in the main scanning direction and the auxiliary scanning direction. The image data, therefore, is memorized with the starting part for reading as the first address and the end part of reading as the last address. The image data, however, is such that the image of one original document is memorized as divided in two areas, i.e. area 01 and area 01, as illustrated in FIG. 24A. The image data memorized in each of the areas is managed by the managing table MT such that the one original document is managed in the two areas. In the case of the original document of No. 1, the former half of the original document is memorized in the area 01 and the latter half thereof in the area 02.

The printing is executed on the basis of the designation issued by the output designating table similarly in the case of the 2-in-1 mode described above.

The output designating table to be used in the 1-in-1 right binding issues a designation to print first the area 01 containing the latter half of the image data of the original document of No. 1 (the former connection "00") and subsequently designates the area 01 so as to print the former half of the original document of No. 1 (the formation of images on one output sheet completed with the latter connection "FF") as illustrated in FIG. 25 because it has already issued a designation to print first the latter half of one master original document as in the procedure of the routine for the compilation of image mentioned above (the step S27, FIG. 16 refers).

The printout is effected on the basis of the output designating table. The result is the same as in the case of the 2-in-1 mode described above. The second page in the direction of conveyance of sheet is printed first on one sheet as illustrated in FIG. 20A. The folded sheets bearing the images are accumulated in the sheet accumulating part 11b of the finisher 1 such that the first page occupies the lowermost position as illustrated in FIG. 20B. A booklet finished in right binding as illustrated in FIG. 30A is obtained by binding the edge parts (the sides having no crease of fold) of the thus accumulated sheets with staples.

Figures 26, 27:
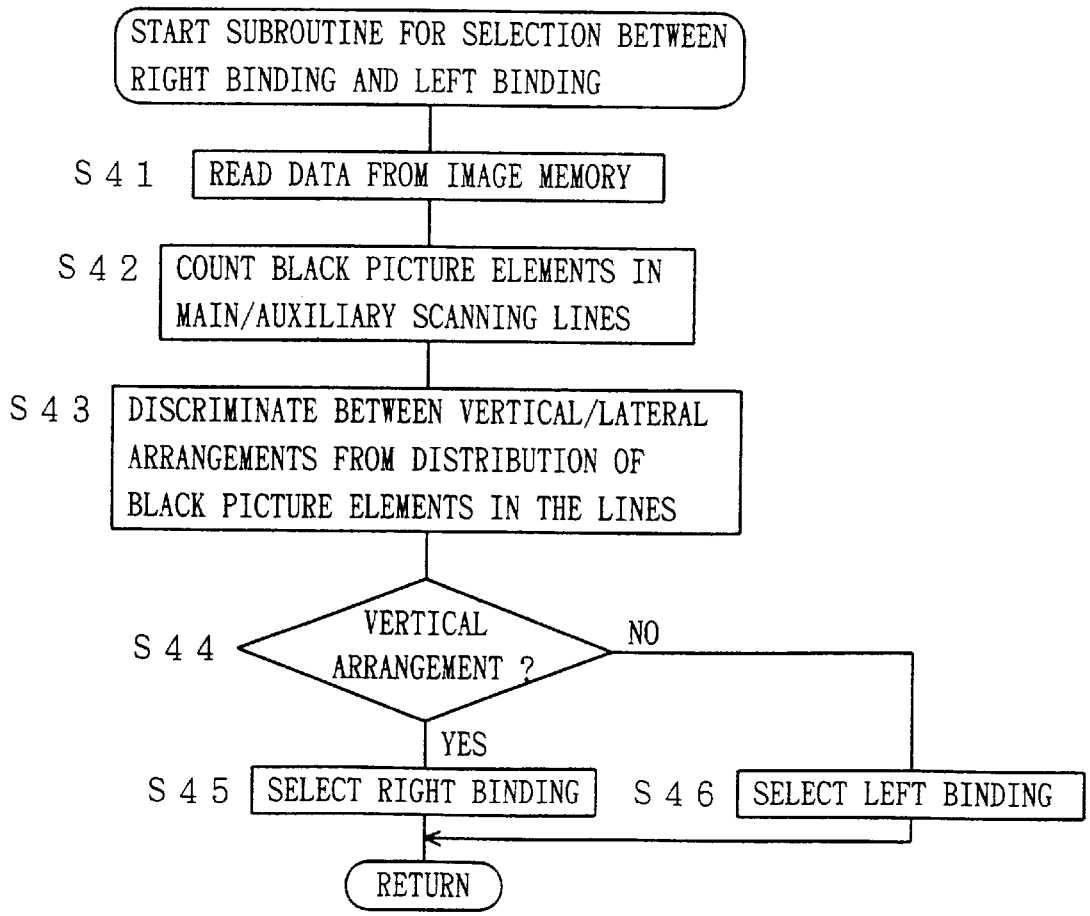
FIG. 26 is a diagram to aid in the description of an output designating table in the 1-in-1 left binding.
FIG. 27 is a subroutine flow chart for automatic selection between the right binding and the left binding.

The output designating table to be used in the 1-in-1 left binding issues a designation to print first the area 02 containing the latter half of the original document of No. 1 (the former connection "00") and print subsequently the area 01 containing the former half and, at the same time, issues a designation to rotate the image by 180° and change the direction of the image as an additional information for each of the designations, as illustrated in FIG. 26.

As respects the printout, similarly in the 2-in-1 mode, the second page in the direction of conveyance of sheet is first printed on one sheet and the image is inverted from that in the case of the right binding as illustrated in FIG. 22A. The folded sheets bearing the images are accumulated in the sheet accumulating part 11b of the finisher 2 such that the first page occupies the lowermost position as illustrated in FIG. 22B. A booklet finished in left binding as illustrated in FIG. 30B is produced by binding the edge parts (the sides having no crease of fold) of the sheets accumulated as described above with staples.

Embodiment 2, as described above, prints images properly on one sheet and produces a booklet finished in right covered binding or left covered binding as expected when the choice between the right covered binding and the left covered binding is designated by means of the operating panel OP.

[Embodiment 3]

While Embodiment 1 contemplates relying on the operating panel OP to designate the choice between the right binding and the left binding, the decision between the right binding and the left binding may be automatically made and put to execution. Embodiment 3 embodies the automatic discrimination between the right binding and the left binding. More often than not in the case of the documents written in the Japanese language, the documents having characters arranged vertically are in the right binding and the documents having characters arranged laterally are in the left binding. The discrimination in question has been automated by utilizing the fact just mentioned in deciding whether a given original document has characters arranged longitudinally or laterally. The construction and basic operation of the equipment, etc. involved in Embodiment 3, therefore, are invariably identical with those of Embodiment 1 and will be omitted from the description.

FIG. 27 is a flow chart showing the procedure of operation for discerning between the longitudinal and the lateral arrangement of characters and consequently deciding between the right binding and the left binding. Incidentally, this procedure of operation is inserted as a subroutine in the main flow chart for the copying and binding operation illustrated in FIG. 8, between the step S4 and the step S5, for example.

First, after the images on all the original documents to be copied are read in and memorized in the image memory 825, the copying machine grade CPU 910 reads the data of the first page from the image memory 825 (S41). While the image data is read out of the image memory 825, the discrimination between an original document of vertically arranged characters and an original document of laterally arranged characters is attained (S43) by sequentially examining the component picture elements of the data in the main scanning direction and the auxiliary scanning direction to determine whether or not they are black squares (the choice between "0" and "1"), taking count of black picture elements (data "1") (S42), distributing the counts of black picture elements in the lines of the main and the auxiliary scanning directions, and finding the distribution of black picture elements in the main and the auxiliary scanning lines.

Figure 28A:
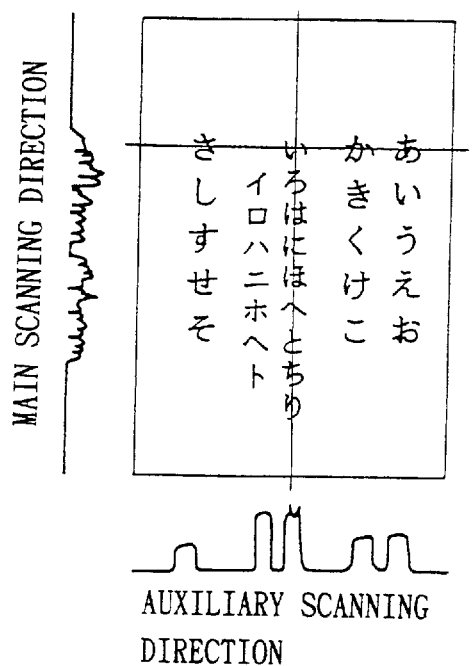
FIGS. 28A and 28B are diagrams to aid in the description of an operation of detecting the horizontal or the lateral arrangement of characters in an original document.
Figure 28B:
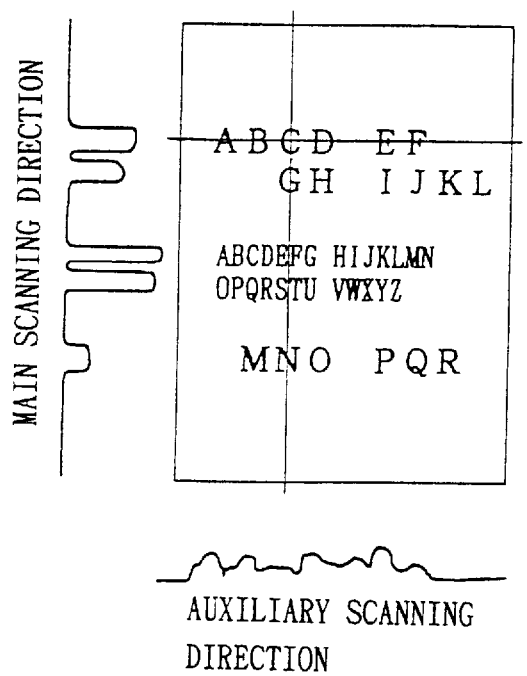

As shown in the histogram of FIG. 28A, an original document of vertically arranged characters is judged as having lines of characters arranged in the auxiliary scanning direction because the black picture elements are distributed more densely in the main scanning direction in which the lines are arranged than in the auxiliary scanning direction which is the direction of the lines (the direction in which the lines are arranged). In contrast, an original document of laterally arranged characters is judged as having lines of characters arranged in the main scanning direction because the black picture elements are distributed more densely in the auxiliary scanning direction in which the characters are arranged than in the main scanning direction which is the direction of the lines (the direction in which the lines are arranged), as shown in the histogram of FIG. 28B.

Then, based on the result of the discrimination, the right binding is selected (S45) in the case of an original document of vertically arranged characters (S44) and the left binding is selected (S46) in the case of an original document of laterally arranged characters (S44).

Owing to the mechanism described above, Embodiment 3 is enabled to produce automatically a booklet of right or left binding, depending on the manner in which the characters are arranged in the original documents (vertical or lateral arrangement of characters).

As a modification of Embodiment 3, the procedure shown in the flow chart of FIG. 27 can be applied to the case of the covered binding. In this case, this procedure of operation is inserted as a subroutine in the main flow chart for the copying and covered binding operation illustrated in FIG. 15, between the step S14 and the step S15, for example.

The entire disclosure of each of Japanese Patent Application No. 8-351477 filed on Dec. 27, 1996 and Japanese Patent Application No. 8-351479 filed on Dec. 27, 1996 including specification, claims, drawings and summary are incorporated herein by reference in its entirety.

What is claimed is:

1. An image forming apparatus, comprising:

an image data memory device for memorizing image data to be emitted on a sheet;

an image processing device for changing the direction in which an image memorized in said image data memory device is emitted onto the sheet;

an image producing device for producing an image on the sheet from the image data;

a sheet accumulating device disposed on the downstream side of a conveying path for sheets emanating from said image producing device and adapted to accumulate a plurality of the emanating sheets;

a cover storing device for storing a plurality of covers each having a fusible adhesive agent applied to the inside of a back part of a cover;

a cover delivering device for extracting the covers one by one from said cover storing device;

a cover supporting device for supporting severally the covers delivered from said cover delivering device in an opened state;

a sheet delivering and inserting device for conveying the plurality of emanating sheets from said sheet accumulating device and inserting them into the cover supported in an opened state by said cover supporting device;

a heating device for warming the part of the back of the cover having inserted therein the plurality of emanating sheets conveyed by said sheet conveying device thereby melting the fusible adhesive agent and inducing adhesion of the plurality of emanating sheets to the cover; and a control device for controlling said image processing device so as to change the direction of the image emitted onto the sheet, depending on whether the plurality of emanating sheets are to be joined to the cover on the right binding or the left binding.

2. An image forming apparatus, comprising:

an image reading device for reading an image on an original document;

an image data memory device for memorizing as image data the image read by said image reading device;

an image data processing device for processing the image data memorized by said image data memory device so as to change the direction of the image and the order of emission of the image on the basis of the image data thereby causing the image to be emitted as required onto a sheet;

an output device for emitting the image data processed by said image data processing device onto the sheet;

a sheet folding device for folding at least doubly the sheet emitted from said output device;

an accumulating device for accumulating a plurality of sheets folded by said sheet folding device;

a stapling device for binding a bundle of sheets accumulated by said accumulating device; and a controlling device for preparatorily selecting the position of binding to be used by said stapling device between the right binding and the left binding and then controlling said image data processing device so as to change the direction of the image and the order of emission of the image on the sheet, so as to enable the stapling treatment to be performed in the right binding or the left binding as selected.

3. An image forming apparatus according to claim 2, wherein said controlling device comprises an image discriminating device for discriminating the direction of the image and an input device for designating the selection of right binding or left binding and is adapted to change the direction of the image and the order of emission output of the image on the sheet so as to conform to the direction of bind selected by said input device based on the direction of the image discriminated by said image discriminating device.

4. An apparatus according to claim 2, wherein said accumulating device accumulates doubly folded sheets.

5. An apparatus according to claim 2, wherein said stapling device staples a bundle of doubly folded sheets.

6. An image forming apparatus, comprising:

an image data memory device for memorizing image date to be emitted onto a sheet;

an image processing device for changing the direction in which an image memorized by said image data memory device is emitted on the sheet;

an image producing device for producing an image on the sheet from the image data;

a sheet conveying device for conveying sheets into a cover; and a controlling device for controlling said image processing device so as to change the direction of the image emitted on the sheet, depending on the direction in which the sheets are received in the cover between the right binding and the left binding.

7. An apparatus according to claim 6, which further comprises a sheet accumulating device disposed on the downstream side of a conveying path for the sheet emanating from said image producing device and adapted to accumulate a plurality of sheets emanating from said image producing device.

8. An apparatus according to claim 7, which further comprises a cover supporting device for supporting the cover in an opened state.

9. An apparatus according to claim 8, wherein said sheet conveying device conveys a plurality of sheets from said sheet accumulating device and inserts the plurality of sheets into the cover supported in an opened state by said cover supporting device.

10. An apparatus according to claim 7, which further comprises a stapling device for stapling a bundle of sheets accumulated by said sheet accumulating device.

11. An apparatus according to claim 10, wherein the cover receives for storage therein a stapled bundle of sheets.

12. An apparatus according to claim 6, wherein the cover has a fusible adhesive agent applied to the inside of a back part of a cover.

13. An apparatus according to claim 12, which further comprises a heating device for warming the part of the back of the cover thereby fusing the fusible adhesive agent and inducing adhesion of the sheets to the cover.

14. An apparatus according to claim 6, wherein the cover is transparent.

15. An apparatus according to claim 6, which further comprises a cover storing device for storing a plurality of covers.

16. An apparatus according to claim 15, which further comprises a cover feeding device for extracting the covers one by one from said cover storing device.

17. An apparatus according to claim 6, which further comprises a cover supporting device for supporting the cover in an opened state.

18. An apparatus according to claim 17, wherein said sheet conveying device conveys a plurality of sheets from a sheet accumulating device and inserts the sheets into the cover supported in an opened state by said cover supporting device.

* * * * *